United States Patent
Frouin

(10) Patent No.: US 6,891,797 B1
(45) Date of Patent: May 10, 2005

(54) METHOD AND DEVICE FOR COMMUNICATING INFORMATION

(75) Inventor: Laurent Frouin, Chantepie (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/345,969

(22) Filed: Jul. 1, 1999

(30) Foreign Application Priority Data

| Jul. 6, 1998 | (FR) | ............................................ 98 08627 |
| Jul. 6, 1998 | (FR) | ............................................ 98 08628 |
| Jul. 6, 1998 | (FR) | ............................................ 98 08629 |
| Jul. 6, 1998 | (FR) | ............................................ 98 08626 |

(51) Int. Cl.$^7$ ............................................. H04L 12/56
(52) U.S. Cl. ....................... 370/230; 370/235; 370/443; 370/468
(58) Field of Search .............................. 370/230, 230.1, 370/232, 235, 395.2, 395.21, 395.42, 400, 443, 444, 468, 477, 236, 352, 396, 395.31

(56) References Cited

U.S. PATENT DOCUMENTS

| 5,243,595 | A | * | 9/1993 | Woest et al. ................. 370/469 |
| 5,347,511 | A | * | 9/1994 | Gun ........................... 370/255 |
| 5,615,254 | A | * | 3/1997 | Qiu et al. .................... 379/221 |
| 5,621,898 | A | * | 4/1997 | Wooten ....................... 395/297 |
| 5,649,108 | A | * | 7/1997 | Spiegel et al. ......... 395/200.12 |
| 5,689,244 | A | * | 11/1997 | Iijima et al. ........... 340/825.07 |
| 5,828,656 | A | * | 10/1998 | Sato et al. ................... 370/254 |
| 5,940,372 | A | * | 8/1999 | Bertin et al. ................. 370/238 |
| 5,991,831 | A | * | 11/1999 | Lee et al. ...................... 710/33 |
| 6,005,861 | A | * | 12/1999 | Humpleman ................. 370/352 |
| 6,011,804 | A | * | 1/2000 | Bertin et al. ................. 370/468 |
| 6,038,625 | A | * | 3/2000 | Ogino et al. ................. 710/104 |
| 6,108,718 | A | * | 8/2000 | Fujimori et al. ................ 710/9 |
| 6,125,397 | A | * | 9/2000 | Yoshimura et al. ......... 709/235 |
| 6,252,886 | B1 | * | 6/2001 | Schwager et al. .......... 370/443 |
| 6,278,709 | B1 | * | 8/2001 | Walker et al. ............... 370/392 |
| 6,324,184 | B1 | * | 11/2001 | Hou et al. .................... 370/468 |
| 6,356,545 | B1 | * | 3/2002 | Vargo et al. ................. 370/355 |
| 6,400,681 | B1 | * | 6/2002 | Bertin et al. ................. 370/218 |
| 6,501,731 | B1 | * | 12/2002 | Chong et al. ............. 370/230.1 |

FOREIGN PATENT DOCUMENTS

| EP | 606837 | 7/1994 |
| EP | 627866 | 12/1994 |
| EP | 660569 | 6/1995 |
| EP | 777362 | 6/1997 |
| EP | 800329 | 10/1997 |

OTHER PUBLICATIONS

Shea, T.J. et al "Evaluation of IEEE 1394 Serial Bus for Distributed Data Acquisition" Particle Accelerator Conference, May 12–16, 1997, vol. 2, pp. 2502–2504.*

Breevoort, C.M. "A Multi–Services Communication Architecture For In–Home USB and IEE–1394 Based Devices" Consumer Electronics, Jun. 2–4, 1998, pp. 110–111.*

(Continued)

Primary Examiner—Chi Pham
Assistant Examiner—Anh-Vu H. Ly
(74) Attorney, Agent, or Firm—Fitzpatrick, Cella, Harper & Scinto

(57) ABSTRACT

A communication system for communicating on a network that includes communication devices performs communications in a connected mode or a non-connected mode. For at least one of the communication devices, to effect a transmission in the connected mode, the system performs an information operation during which an item of information representing a passband necessary for the transmission in the connected mode is broadcast on the network. The system performs a passband allocation operation to allocate the passband for connected-mode transmissions, based on the item of information. A second allocation operation is performed to allocate, for non-connected-mode transmissions, all or part of the passband not allocated for the connected-mode transmissions. The system adjusts the allocated passband to avoid congestion on the network.

6 Claims, 15 Drawing Sheets

OTHER PUBLICATIONS

Tan, Yasuo "Scaling Up a IEEE 1394 DV Network to an Enterprise Video LAN with ATM Technology" Consumer Electronics, Jun. 2–4, 1998, pp. 112–113.*

Severance, C. "Linking Computers and Consumer Electronics" Computer, Feb. 1997, vol. 30, Issue 2, pp. 119–121.*

Atsushi Iwata et al., "PNNI Routing Algorithms for Multimedia ATM Internet, " NEC Res. & Develop., vol. 38, No. 1, Jan. 1997, pp. 60–73.

Barry M. Cook, "IEEE 1355 data–strobe links: ATM speed at RS232 cost," Microprocessors and Microsystems, vol. 21, 1998, pp. 421–428.

C.R. Brown et al., "Exploiting IEEE 1355 Routable Serial Links in a Real–Time Vision Architecture," Real–Time Imaging, vol. 3, 1997, pp. 355–361.

Mohammed Peyravian et al., "Algorithm for efficient generation of link–state updates in ATM networks," Computer Networks and ISDN Systems, vol. 29, 1997, pp. 237–247.

Malathi Veeraraghavan et al., "ATM switch routers for combined connection–oriented and connectionless transport," IEEE Global Telecommunications Conference, Phoenix, AZ, Nov. 3–8, 1997, vol. 3, pp. 1481–1487.

Yoshiakl Takabatake et al., "An Evaluation And A Proposal for Fair Crankback Algorithm," ISS '97, World Telecommunications Congress, Toronto, Sep. 21–26, 1997, vol. 1, pp. 465–471.

Jürgen Totzke et al., "A Prototyped Implementation of B–ISDN Signalling at the Network Node Interface," Globecom '95, IEEE Global Telecommunications Conference, Singapore, Nov. 14–16, 1995, vol. 1, pp. 252–257.

Ho–Ting Wu et al., "Integration of Synchronous and Asynchronous Traffic on the Metaring Architecture and its Analysis," Discovering A New World of Communications, vol. 1, Jun. 14–18, 1992, pp. 147–153.

Z.L. Budrikis et al., "A Generic Flow Control Protocol for B–ISDN," One World Through Communications, Florence, May 4–8, 1992, vol. 2, No. Conf. 11, Aug. 3, 1992, pp. 895–904.

Richard Platt, "Why IsoEthernet Will Change The Voice and Video Worlds," IEEE Communications Magazine, vol. 34, No. 4, Apr. 1, 1996, pp. 55–59.

Baruch Awerbuch et al., "Distributed Control For Paris," Proc. Annual ACM Symp. On Principles of Distributed Computing, Aug. 22, 1990, pp. 145–159.

James Yan et al., "Traffic Considerations in the Synthesis of an ATM–based Network," $9^{th}$ ITC Specialists Seminar: Teletraffic Modelling and Measurement Broadband and Mobile Communications, Leidschendam, Nov. 7–9, 1995, Seminar 9, pp. 27–44.

A.F. Benner, "Fibre Channel: Gigabit Communications AND i/o for Computer Networks," McGraw–Hill, New York, 1996, pp. 187–198.

* cited by examiner

METHOD AND DEVICE FOR COMMUNICATING INFORMATION

BACKGROUND OF THE INVENTION

1. Field of the Invention

The present invention concerns a method and a device for communicating information.

It applies in particular to an asynchronous packet switched network, making it possible notably to interconnect a small number of items of multimedia equipment, whilst providing them with different service qualities for exchanging data.

2. Description of the Related Art

The behavior of data traffic generated by an item of multimedia equipment (or application) can fall within two main service classes, themselves each divided into subclasses. Thus the traffic can be either elastic (it adapts easily to changes in transmission conditions), or real time. If it is elastic, it can either be interactive in nature, and therefore sensitive to the transfer time, or can correspond to a massive transfer of a large volume of data and therefore sensitive to the passband. If it is a case of real-time traffic, either it is acceptable to lose certain information packets in order to give priority to the transmission time, and the traffic is then referred to as "predictive", or it is preferable to have a moderate transmission rate but without loss of data, and the traffic is then referred to as "guaranteed".

The elastic traffic corresponds to traffic of the datagram type. This traffic is said to be elastic since it is capable of adapting to the transmission conditions without for all that losing its utility. A file transfer can be performed either via a path supporting a transmission rate of 64 kilobits per second or via a path supporting a transmission rate of 2 megabits per second. With elastic traffic, a first basic class concerns the traffic generated by interactive or transactional applications (such as an application of the client-server type), and a second class identifies the data conveyed by block (such as the transfer of files).

The equipment generating a real-time traffic requires a predictive or guaranteed service. For predictive traffic, which gives priority to complying with a high constraint with regard to the transmission time, the application specifies the passband which it is assumed to require, as well as the maximum transmission time which it can accept. The network gives priority to this type of traffic but gets rid of the data for which the transmission time cannot be complied with. It is a case for example of video transmission (in the event of transmission problems, a static image appears) or audio systems of average quality.

The so-called guaranteed service is differentiated from the predictive service by the fact that the network does not intentionally get rid of the data coming from a guaranteed traffic but this may have a variable transmission time according to the predictive traffic with a higher priority or the concurrent guaranteed traffic. It is a case, for example, of high-definition video traffic (using compression techniques). In this case, the network reserves the passband for the application which requires a guaranteed service, but, in order to manage problems of jitter on the data on reception, the application must have temporary data storage capacities (around one second of traffic) in order to re-establish the original behavior of the traffic.

The service quality guarantee required by concurrent applications of different natures is achieved by resolving problems such as the management of resources and the control of traffic. The methods to be used must enable the network to function optimally whilst affording a service quality acceptable to the different applications. This problem has been the subject of many studies for circuit switched networks and for packet switched networks.

In circuit switched networks, the known solution consists of allocating to each connection a passband (channel) which is constant throughout its life. Prior to this, a call acceptance procedure enables the network to know whether it can support the call. Where no channel is available, the call is rejected.

In packet switched networks, where the traffic is, by definition, unpredictable, the variable nature of the transmission rates offers the opportunity of a statistical sharing of the network resources. This optimization of resources unfortunately increases the risks of congestion. These networks can be seen as a succession of queues of limited capacity, whose filling it is necessary to control in order to prevent their saturation, synonymous with loss of packets.

It is known that the traffic can be controlled by a so-called "windowing" mechanism: when a saturation state is detected, the receiver explicitly requests the source to reduce its flow. This is then referred to as flow regulation and control.

Neither of these approaches is sufficient, the first because it leads to an inevitable waste of resources in the network by allocating, to the source, a passband corresponding to its maximum transmission rate, and the second because the ratio of propagation time to transmission time increases considerably when the links are at a very high transmission rate. In systems controlling flow by feedback, between the moment of sending of the notification of congestion and the moment of its reception by the source node, the traffic already in transit in the network can be considered to be definitively lost because of the congestion, unless there are large-capacity memories available for storing all the packets in transit during the congestion state.

Consequently, for rapid switching of packets, purely reactive control methods are insufficient in a high throughput environment. Switching requires elaborate mechanisms in the switching equipment (intermediate nodes in the network) including preventive methods and reactive methods. ATM (Asynchronous Transfer Mode) technology proposes techniques for managing the service quality and controlling congestion based on elaborate mechanisms implemented within the switching equipment. Examples of such mechanisms are described in U.S. Pat. Nos. 5,291,481 and 5,313,454, which also illustrate the complexity and potential cost of implementing such methods.

These methods are therefore not suited to networks comprising a smaller number of items of equipment to be interconnected, where the cost of the communication means must not be too high compared with the cost of the equipment to be interconnected.

Attempts to use on-board ATM switches have been made, such as the one described in the thesis "Real-time distributed architecture based on ATM" by Jean-Francois Guilaud (INPG). This thesis mentions the use of conventional ATM signaling for managing connections, which represents a complex implementation. However, the complete use of connection management mechanisms must make provision for preventing congestion, which, in order to simplify the use of the switch, are based on a local management of the load information and on the use of queues at the output for each switch.

Strict flow control, at the source, as described in the thesis, provides for the use of a connected mode solely, and checks that the transfer of data has not been exceeded compared with what was predicted when the corresponding connection was established. This can therefore give rise to a poor use of network resources and a lack of flexibility in the system.

Moreover, no simple means is envisaged for reacting to the problem of congestion except one based on the solutions described above; peculiar to the use of ATM, but which remain complex solutions.

In addition, the use of a fixed packet size, in accordance with ATM, gives rise to a fixed loss of the useful throughput per available network link. On the other hand, a packet size which is variable according to the load on the network makes it possible to optimize the useful throughput. The techniques of controlling the size of the packets have already been tested on network architectures of the bus or ring type.

Asynchronous packet switching, as described in the standard IEEE-P1355, is based on a switching technology (cut-through crossbar allowing several simultaneous paths) with a low implementation cost with regard to the switch. This is because the switch in question uses only a minimum of resources for effecting the switching of a packet from an input port to an output port. The transfer of a packet through the switch takes place as soon as the switch has knowledge of the switching information for the said packet (packet header) without awaiting complete reception of all the packet data. There is therefore no management of queue or priority in the intermediate nodes of the path.

Moreover, in order to regulate the problems of contention in access to an input port (or respectively to an output port) of the switch, when several packets are a priori intended to pass via this input port (or respectively output port), a flow control mechanism at the level of the link is implemented, allowing a source to transmit data on the transmission line only when it has obtained authorisation from the destination, that is to say when a group of data previously sent by the source have been acknowledged by the destination.

However, asynchronous packet switching, as known in the state of the art, though it affords attractive implementation costs, does not guarantee different service qualities for concurrent traffic within the same network.

The technologies of the serial bus type propose an alternative to the use of packet switching for interconnecting the peripherals at lower cost. This is because the mechanisms used for sharing resources are simplified because of the unicity of the main resources, in this case the communication medium. This simplicity also entails the drawback of a limited passband: the mean passband available per terminal decreases as a function of the number of terminals connected.

Certain serial bus technologies, such as those in accordance with IEEE standards, reference P1394, defined for the interconnection of multimedia equipment, support the transfer of data in accordance with mainly two service classes using a logic architecture of the bus type. Mechanisms are therefore necessary for arbitrating access to the bus and organising the data transfer. This serial bus technology provides for a resource reservation mechanism. It affords, on the one hand, the so-called isochronic transmission of data, comprising a reservation phase, and, on the other hand, the so-called asynchronous transmission of data, without reservation phase.

The U.S. Pat. No. 4,914,650 describes a method for organising the transmission of data coming from different queues and for inserting therein an ultra-priority traffic (of the signalling type), coming from a third queue, as well as mechanisms for reacting to the congestion problem in the queues associated with each type of data. It does not propose any solution for limiting the losses of information due to congestion problems and therefore for guaranteeing different service qualities.

The U.S. Pat. No. 5,621,898 illustrates a mechanism for organising the transmission of data on a bus in accordance with the IEEE-P1394 specifications. It thus describes the sequencing of the packet transmissions, associated with different queues, and the mechanisms controlling access to the bus enabling the available passband to be taken into account for the transmission of additional packets.

SUMMARY OF THE INVENTION

The invention aims to allow, on a packet switched network, the sequencing of the transmissions of packets at the source, according to different priorities, as a function on the one hand of the estimated load on the network (keeping up to date a load table for all the traffic connected) and on the other hand as a function of the actual load of the network (flow control at the links).

In its application to a switched network, the present invention aims:

to guarantee equitable access to the network resources comprising several items of multimedia equipment, to organize the transfer of packets so that some of these packets pass through the network with a latency time less than a guaranteed maximum value, to guarantee, for a group of packets forming a flow, a given passband value, to give priority to the transmission of certain packets whose content describes so-called "control" information, to optimize the use of the actual passband of the network, to detect and circumvent the congestion on the network, and to free the switches of the intermediate communication devices from any processing concerning the organisation of the packet sequencing.

To this end, according to a first aspect, the present invention relates to a method of communicating on a network having communication devices, each communication device being adapted to determine, for each item of information which it has to transmit, the path to cause it to follow on the network and a transmission mode, connected or non-connected, characterised in that it includes:

for each communication device which is to effect a transmission in connected mode, an information operation during which said communication device broadcasts, to all the other communication devices in the network, an item of information representing the passband necessary for said transmission in connected mode, and an operation of allocating a passband, during which there is allocated, on the one hand, to the transmissions in connected mode, the passband which is necessary to them and, on the other hand, all or part of the passband available to each transmission to be effected in non-connected mode.

Thus all the communication devices in the network are immediately informed of each connection and of the network resources which are allocated to it.

Before effecting the transmission of a packet in non-connected mode, each of the communication devices able to do it can check that each of the links, or segments, of the path which this packet will follow is available for the transmission of this packet. Congestion can thus be prevented.

The regulation of the load dedicated to the traffic in non-connected mode can thus be effected according to fluctuations in the traffic in connected mode (real time), which makes it possible to continuously optimise the use of the network and to prevent congestion.

According to particular characteristics, the communication method as briefly disclosed above includes, for the establishment of a connection:

effected by the source communication device intended to transmit information on said path, an operation of transmitting, to each communication device placed on said path, referred to as "intermediate", an item of information representing the passband necessary for said connection, and effected by each intermediate communication device on said path, an operation of determining the availability of the link leading to the following communication device on said path and, in the event of unavailability, an operation of transmitting, to the source communication device, an item of information representing the unavailability of said path.

By virtue of these provisions, before establishing a connection, it is checked that the network can support the potential load associated with the connection to be established. In addition, this check is made by each communication device placed on the path associated with this connection.

This taking into account of the estimated load amounts to effecting an estimation of the congestion on the network.

According to other particular characteristics, the communication method as briefly disclosed above includes, for each transmission of information, a flow control operation performed in accordance with IEEE 1355, by each of the intermediate communication devices on the path followed by said information.

By virtue of these provisions, the method according to the invention implements a flow control at the level of the links, both for connected traffic and for non-connected traffic, on a packet switched network. These provisions amount to detecting the congestion on the network.

According to other particular characteristics, the method as briefly disclosed above includes:

for each communication device in the network, following each information operation, an operation of determining the passband available on each link, taking into account said information, and for each so-called "source" communication device which is to effect a transmission in non-connected mode to a destination communication device:

an operation of determining the availability of a path for a transmission in non-connected mode, during which it is determined whether at least one path going from said source communication device to said destination communication device is at least partially available for said transmission, and, in the affirmative, an operation of transmitting on said path, in non-connected mode.

By virtue of these provisions, several paths can be used by the transmissions in non-connected mode, according to the load on the network.

According to other particular characteristics, the communication method as briefly disclosed above includes an information transmission operation taking into account several priority levels, and a priority level is allocated to the transmission in non-connected mode.

By virtue of these provisions, all the traffic in non-connected mode is transmitted with the same priority level, which guarantees equitable access for all the communication devices in the network.

According to other particular characteristics, during the passband allocation operation, the passband associated with the priority level corresponding to the non-connected mode varies as a function of a period which has not given rise to any transmission.

The method of the first aspect of the invention thus makes it possible to increase the passband allocated to the transmissions in non-connected mode, when the period which has not given rise to any transmission increases, which is a sign of an absence of congestion on the network.

According to other particular characteristics, during the passband allocation operation, the passband associated with the priority level corresponding to the non-connected mode varies as a function of a number of packets not transmitted during a predetermined period.

The method of the first aspect of the invention thus makes it possible to reduce the passband allocated to the transmissions in non-connected mode, when the number of packets not transmitted increases, which is a sign of congestion on the network.

According to other particular characteristics, with each priority level there is associated a list of virtual channels, successively used, and said virtual channels are associated with the outgoing traffic.

By virtue of these provisions, the sequencing of the transmissions is effected on the outgoing traffic and there is therefore no management of this traffic by the intermediate communication devices, which simplifies the operation of the network and makes it more efficient.

According to other particular characteristics, the method as briefly disclosed above includes an operation of determining transmission parameters, during which there are determined:

a size of packets transmitted on said network, said operation taking into account the load on said network, a number of packets to be sent on said network, said operation taking into account the load on said network, and/or a period available for sending the packets remaining to be sent on said network, said operating taking into account the load on said network.

Thus the passband can be distributed in an optimum fashion (that is to say efficiently and equitably).

According to particular characteristics, the operation of determining transmission parameters takes place for each communication device, virtual channel by virtual channel.

Thus the transmission parameters can depend on the path used.

According to particular characteristics, said transmission parameter determination operation is performed at the time of the information operation.

By virtue of these provisions, the updating of the parameters can take place in a dynamic and immediate fashion and the network can therefore be reactive to the variations in load constraints.

According to other particular characteristics, for the guaranteed traffic, the information not transmitted during a predetermined interval of time is stored in order to be transmitted during the following interval of time.

By virtue of these provisions, risks of congestion are avoided.

According to a second aspect, the present invention relates to a device for communication on a network having communication devices, each communication device being adapted to determine, for each item of information which it has to transmit, a path to cause it to follow and a transmission mode, connected or not, characterised in that it has:

an information means adapted, for each transmission in connected mode, to broadcast, to all the other communication devices in the network, an item of information representing the passband necessary for said transmission in connected mode, and a passband allocation means, adapted to allocate, on the one hand, to the transmissions in connected mode, the passband which is necessary to it, and, on the other hand, all or part of the passband available to each transmission to be effected in non-connected mode.

The invention also relates to a computer, a camera, a facsimile machine, a photographic apparatus, a television receiver, a printer, a scanner and an audio/video reader, characterised in that they have a device as briefly disclosed above.

The invention also relates to:

an information storage means which can be read by a computer or a microprocessor storing instructions of a computer program characterised in that it allows the implementation of the method of the invention as briefly disclosed above, and an information storage means which is removable, partially or totally, and which can be read by a computer or a microprocessor storing instructions of a computer program characterised in that it allows the implementation of the method of the invention as briefly disclosed above.

The preferential or particular characteristics and the advantages of said device, said computer, said camera, said facsimile machine, said photographic apparatus, said television receiver, said printer, said scanner, said audio/video reader and said information storage means being identical to those of the method as briefly disclosed above, these advantages are not repeated here.

U.S. Pat. No. 5,243,595 presents a bus architecture network of the non-connected type adapted to transmit control messages and which supports the conveyance of data in non-connected mode, and illustrates the advantage of combining the two data transfer modes.

The aim of the invention is similar to that of IEEE-P1394 serial bus architecture, namely the combination of data transfer of the asynchronous (non-connected) type and isochronous (connected) data transfer.

The invention aims to provide, on a packet switched network, the transmission of data in connected mode, comprising a phase of reserving resources on the network and, on the other hand, the transmission of data in non-connected mode, without a resource reservation phase.

Another object of the invention is to guarantee a service quality according to several service classes, for example predictive, guaranteed and elastic.

Other aims of the invention are:

to control the acceptance of connections, to effect a distributed control of the load on the network in order to guarantee coherence of the information relating to the load on the network, in all the communication devices in the network, and to transfer, to the source communication device, the management of the resources associated with the service guarantee required by a traffic type.

To this end, the present invention relates, according to a third aspect, to a method of communicating between communication devices in a packet switched network having at least one switch, characterised in that it includes a transmission mode determination operation, during which, for each item of information to be transmitted, a transmission mode is determined, connected or non-connected, and then for each item of information to be transmitted in connected mode:

an operation of reserving a path on said network, and then an operation of transmitting said information, in connected mode, on the path reserved during the reservation operation, and for each item of information to be transmitted in non-connected mode:

an operation of estimating the availability of a path on said network, and then, when a path is deemed to be available for transmission of said information, an operation of transmitting said information, on said path, in non-connected mode.

By virtue of these provisions, the information to be transmitted in non-connected mode is transmitted only if it is deemed that such transmission can be effected. The risk of congestion on the network is therefore limited, even if transmissions in non-connected mode are enabled.

Thus the method of the third aspect of the invention allows both the transmission of data of short duration (a message), which correspond to transmissions in non-connected mode, and transmissions of long duration (video) which correspond to transmissions in connected mode.

According to particular characteristics, the path reservation operation includes an operation of transmitting, on said path, a message including information representing the application requirement for transmission in connected mode.

By virtue of these provisions, each communication device is informed of the application requirement for the envisaged transmission. This information is identical for each communication device in the network, but it imposes no traffic parameter on the communication devices, the latter being able to take account of their own constraints.

According to other particular characteristics, the operation of reserving a path on said network includes an operation of updating a load table stored by each communication device in the network.

By virtue of these provisions, each communication device stores load information relating to the network, in the form of a load table, and this information is updated each time a transmission in connected mode is established. Management of the load on the network and the estimation of availability of a path are therefore greatly facilitated.

According to other particular characteristics, during the availability estimation operation, account is taken of the values stored in the load table of the communication device which has at least one item of information to be transmitted.

By virtue of these provisions, the availability of a path for a communication in non-connected mode is estimated by taking into account the load on the network related to the communications in connected mode.

According to other particular characteristics, the table updating operation includes an operation of determining parameters representing the application requirement for transmission in connected mode.

By virtue of these provisions, in updating each load table account is taken of the application requirement for transmission in connected mode. However, each communication device can take account of its own constraints (the numbers of packets which it has to send in each of the transmission modes, for example), in order to determine said parameters.

According to other particular characteristics, the load table updating operation includes an operation of storing in memory the passband available for each link in the network forming part of a path associated with a connection.

By virtue of these provisions, the method of the invention makes it possible to vary the size of the packets and to take into account the variation in load which results therefrom.

According to other particular characteristics, the path reservation operation includes an operation of checking, by means of each intermediate communication device on said path, the availability of the path to be reserved.

By virtue of these provisions, it is the intermediate communication devices which resolve the problems of conflicts in access to a link. Any differences between the load tables of the different communication devices in the network are thus compensated for by the action of the intermediate communication devices on the path associated with a connection.

According to other particular characteristics, the estimation operation consists of determining whether at least one path is at least partially available for transmission in non-connected mode.

By virtue of these provisions, the elastic traffic can be the subject of communication in non-connected mode. Management of the transmissions in non-connected mode is therefore effected by taking into account on the one hand the knowledge of the load on the network related to connected traffic and on the other hand partial knowledge (local knowledge) of the load on the network related to non-connected traffic.

The transmissions in non-connected mode therefore have practically the same advantages as transmissions in connected mode, since the risks of congestion are very limited.

According to other particular characteristics, the network uses the IEEE 1355 communication protocol.

By virtue of these provisions, the network benefits from a reliable protocol implementing routing at the source, control of flows at the links and packets of variable size.

According to a fourth aspect, the present invention relates to a device for communicating on a packet switched network having at least one switch, characterised in that it has:

a transmission mode determination means adapted to determine, for each item of information to be transmitted, a transmission mode, connected or non-connected, a reservation means adapted, for each item of information to be transmitted in connected mode, to reserve a path on said network, a path availability estimation means adapted, for each item of information to be transmitted in non-connected mode, to estimate the availability of at least one path, and a transmission means adapted on the one hand to transmit, in connected mode, each item of information to be transmitted in connected mode, on the path reserved by the reservation means, and on the other hand to transmit, in non-connected mode, on a path deemed to be available by the availability estimation means, each item of information to be transmitted in non-connected mode.

The invention also relates to:

an information storage means which can be read by a computer or a microprocessor storing instructions of a computer program characterised in that it allows the implementation of the method of the invention as briefly disclosed above, and an information storage means which is removable, partially or totally, and which can be read by a computer or a microprocessor storing instructions of a computer program characterised in that it allows the implementation of the method of the invention as briefly disclosed above.

The preferential or particular characteristics and the advantages of said device, said computer, said camera, said facsimile machine, said photographic apparatus, said television receiver, said printer, said scanner, said audio/video reader and said information storage means being identical to those of the method as briefly disclosed above, these advantages are not repeated here.

The U.S. Pat. No. 5,615,254 describes a method for constructing routing tables comprising, for each pair of nodes, one direct path and several standby paths and for periodically updating these tables according to load information. It does not however make any a priori choice of a path on the basis of actual information on the load, which makes it possible to improve the efficiency of the connection acceptance control process.

The U.S. Pat. No. 5,649,108 describes the drawback of using routing at the source without a priori knowledge about the load on the network and therefore proposes re-routing by certain nodes which for their part have knowledge of this load. However, routing at source remains more effective when the source itself has knowledge about the actual load.

The invention aims to make it possible, on a packet switched network, on the one hand to control acceptance of the connections, according to a path defined at source, on the basis of information representing the load on the network associated with all the active connections, and on the other hand to update the load tables independently of the knowledge of each node (calculation of traffic parameters according to the application requirement, effected by each node).

The invention proposes to improve this prior art for a network with path management at source. To this end, the present invention proposes, in particular, to use:

signalling means which allow exchanges during the establishment phase (by means of specific format messages which enable on the one hand each node to indicate the requirements of its applications, requirements which form fixed parameters, and on the other hand each neighbouring node to be informed of the requirements of the applications, by means of specific format messages), path selection means (consisting of a load table), in each source node, which enable it to determine the path to be followed by each message which it has to transmit, and load monitoring means (each node being capable of storing the information on the total load on the network, as a function of the traffic parameters, by virtue of the structure of the load table).

Thus, when a path is available, it is allocated to the connection and conflicts are avoided, even if the load tables are not consistent, by virtue of the intermediate nodes.

Thus the present invention relates, according to a fifth aspect, to a method of communicating on a network, characterised in that it includes, for establishing a connection:

A/ performed by a communication device which is a source of information to be transmitted in connected mode:

an operation of determining a passband requirement for the transmission of said information in connected mode, an operation of determining any path available for said transmission, according to information stored in a load table for each link in the network, and when an available path is determined:

an operation of transmitting an item of information representing said passband requirement to the following communication device on said path, and an operation of updating said load table for the links in the network, an operation of broadcasting, to at least all the communication devices outside the path, an item of information representing said passband requirement, B/ performed by each intermediate communication device on said path:

an operation of determining availability of said path, for said communication, according to information stored in a load table for each link in the network, and when the path is available:

an operation of sending an item of information representing said passband requirement, to the following communication device on the path, and an operation of updating a load table for the links in the network, C/ performed by each communication device outside said path:

an operation of updating a load table for the links in the network.

By virtue of these provisions, each communication device in the network stores a load table containing information representing all the connections already established. It can therefore manage the transmissions which it has to effect, whether in connected mode or in non-connected mode.

Thus the updating of the load tables of the communication devices is simultaneous with the establishment of the connection. This gives rise to better control of the acceptance of the connections. The choice of a path therefore has less chance of being erroneous.

According to particular characteristics, during the operation of transmitting said passband requirement to the following communication device on said path, the source communication device transmits an item of information representing an application requirement for said transmission in connected mode.

According to other particular characteristics, the method as briefly disclosed above includes, performed for each communication device in the network, an operation of determining communication parameters depending on the application requirement, and said parameters are taken into account in performing the table updating operation.

By virtue of each of these provisions, each connection is characterised in the same way, by the application requirement, for all the communication devices in the network, whatever the constraints inherent in each of these communication devices. On the other hand the parameters may vary, communication device by communication device, as a function of these inherent constraints and the information to be transmitted.

According to other particular characteristics, the method as briefly disclosed above includes, at the end of the transmission in connected mode:

performed by a communication device which is a source of information transmitted in connected mode, an operation of broadcasting an item of information representing the release of the connection, to all the communication devices in the network, and performed by each communication device in said network, an operation of updating a load table for the links in the network.

By virtue of these provisions, each communication device in the network stores a load table containing information representing solely the valid connections, and not the connections which have been released, in order to improve the processing time for the updates of the load tables.

According to other particular characteristics, during the establishment of a connection, the operation of broadcasting, to at least all the communication devices outside the path, an item of information representing said passband requirement is performed after each communication device on said path has performed:

an operation of determining the availability of said path, for said communication, as a function of information stored in a load table for each link in the network, and when the path is available:

an operation of transmitting said passband requirement to the following communication device on the path, and an operation of updating a load table for the links in the network.

By virtue of these provisions, the communication devices in the network which are not situated on said path have to effect an updating of their load table only if each communication device on the path has determined that this path is available for the envisaged transmission. In addition, for all the communication devices in the network, the load tables prevent any conflicts in establishing a connection.

According to other particular characteristics, the method as briefly disclosed above includes, during the establishment of a connection, performed by the source communication device, an operation of determining the whole of the path intended to be followed by the information to be transmitted in connected mode.

According to these provisions, the selection of the path by the communication device which is the source of the information to be transmitted improves the time taken to establish a connection.

According to a sixth aspect, the present invention relates to a device for communicating on a network, characterised in that:

it has a memory adapted to store a load table containing information relating to the load on each link in the network, and it is adapted, for establishing a connection intended for the transmission of information in connected mode:

to determine a passband requirement for the transmission of said information in connected mode, to determine any path available for said transmission, as a function of information stored in said load table, and, when an available path is determined, to transmit an item of information representing said passband requirement, to the following communication device on said path, to update said load table, to broadcast, to at least all the communication devices outside the path, an item of information representing said passband requirement.

The invention also relates to a computer, a camera, a facsimile machine, a photographic apparatus, a television receiver, a printer, a scanner and an audio/video reader, characterised in that they include a device as briefly disclosed above.

The invention also relates to:

an information storage means which can be read by a computer or a microprocessor storing instructions of a computer program characterised in that it allows the implementation of the method of the invention as briefly disclosed above, and an information storage means which is removable, partially or totally, and which can be read by a computer or a microprocessor storing instructions of a computer program characterised in that it allows the implementation of the method of the invention as briefly disclosed above.

The preferential or particular characteristics and the advantages of said device, said computer, said camera, said facsimile machine, said photographic apparatus, said television receiver, said printer, said scanner, said audio/video reader and said information storage means being identical to those of the method as briefly disclosed above, these advantages are not repeated here.

The U.S. Pat. No. 5,042,027 describes a communication method organised around a centralised system for collecting information on the load on the network in order to optimise the selection of the paths.

The U.S. Pat. No. 5,347,511 describes a detailed organisation of the information on the load on the links as a function of the service classes, this information being stored in a database.

In both cases, the correct functioning of these methods is based on the validity of the load information and therefore on the speed of updating this information. This updating constitutes an object of the present invention.

The invention aims to afford, on a packet switched network, on the one hand the synchronisation of the updating of the load tables for each node and the establishment of this connection, and on the other hand limitation of the exchanges of control messages used for this synchronisation.

In its application to a switched network, the present invention aims:

to guarantee equitable access to the network resources comprising several items of multimedia equipment;

to organise the transfer of packets so that some of these packets pass through the network with a latency time less than a guaranteed maximum value;

to guarantee, for a group of packets forming a flow, a given passband value;

to give priority to the transmission of certain packets whose content describes so-called "control" information, to optimise the use of the actual passband of the network, to detect and circumvent the congestion on the network, and to free the switches of the intermediate communication devices from any processing concerning the organisation of the packet sequencing.

To this end, according to a seventh aspect, the present invention relates to a method of communicating on a network, between communication devices each able to determine the path to be followed by each item of information which it has to transmit, characterised in that it includes:

performed by each so-called "source" communication device which requires a connection associated with a path, in order to effect a transmission of information to a destination communication device, an operation requesting a connection, during which the source communication device transmits, to each communication device on said path, a request to establish a connection, when establishment of said connection is possible, performed by at least the destination communication device, an operation of transmitting, to the source communication device, a connection acceptance, performed by the source communication device, an operation of broadcasting, to all the communication devices in the network, an item of information representing the establishment of the connection, performed by each communication device on said path, on reception of said information representing the establishment of a connection, an operation of confirming the establishment of said connection, and performed by each communication device outside said path, on reception of said information representing the establishment of a connection, an operation of storing in memory an item of information representing said connection.

By virtue of these provisions, the same item of information, broadcast to all the communication devices in the network, serves on the one hand to confirm the establishment of the connection to all the communication devices in the network which are situated on the path associated with the connection and on the other hand to inform all the communication devices which are not on said path, of the establishment of the connection.

Thus each communication device in the network is informed of each connection establishment and can therefore determine the suitability of a transmission or broadcast on said network. Congestion of the network can therefore be avoided in this way.

The coherence of the information on the network is thus reinforced.

According to particular characteristics, each communication device on said path performs, on reception of the request to establish a connection, an operation of checking the possibility of establishing said connection.

By virtue of these provisions, the intermediate communication devices prevent congestion of the network.

According to other particular characteristics, each communication device on said path, when, during the checking operation, the possibility of establishing the connection has been verified, performs an operation of reserving resources necessary for said connection.

By virtue of these provisions, these resources are reserved until, on reception of the information broadcast by the source communication device, the connection is taken into account.

Thus risks of conflicts in establishment of connections are avoided even if the establishment of a connection has not yet been confirmed.

According to other particular characteristics, each communication device on said path, when, during the checking operation, the possibility of establishing the connection is not verified, performs an operation of transmitting, to the source communication device, an item of information representing the impossibility of setting up the connection by said intermediate communication device.

By virtue of these provisions, as soon as the establishment of the envisaged connection proves impossible on the envisaged path, the source communication device is informed thereof.

According to other particular characteristics, when establishment of said connection is possible, the operation of transmitting, to the source communication device, an item of information representing a connection acceptance, is performed solely by the destination communication device.

By virtue of these provisions, the information representing acceptance of a connection can be sent by the destination communication device using any transmission mode, and on any path in the network.

This improves the effectiveness of the establishment of the connection and eliminates the processing of an item of information on acceptance of connection in each of the intermediate communication devices.

According to other particular characteristics, in order to transmit said item of information representing a connection acceptance, the destination communication device performs an operation of choosing a path independent of the path associated with the connection currently being established.

Thus the least loaded path can be chosen and the efficiency of the connection establishment can be improved.

According to other particular characteristics, the method as briefly disclosed above includes, during the establishment of a connection, performed by each communication device in the network, an operation of updating a load table containing information representing loads on links in the network incorporated in a path associated with a connection.

By virtue of these provisions, each communication device has a load table which enables it to determine the availability of each link or of each path in the network, either for the transmission of information which it may have to effect or as an intermediate communication device or destination communication device.

Thus the quantity of information to be processed is limited to that which corresponds to the valid connections.

According to other particular characteristics, the operation of broadcasting, to all the communication devices in the network, an item of information representing the establishment of the connection, an operation performed by the source communication device, is performed on a spanning tree for the network where at least half the leaves are intermediate communication devices or the destination communication device, on the path associated with the connection.

Thus it is ensured that the information operation as often as possible precedes the confirmation operation which, in this case, will not take place if a malfunctioning of the network occurs in a communication device which is not on the path associated with the connection currently being established. Thus certain operating problems in the network can be detected.

According to particular characteristics, the request to establish a connection sent by the source communication device includes an item of information representing the application requirement for the transmission in connected mode associated with said connection.

By virtue of these provisions, each communication device can determine the traffic parameters which depend on the application requirement.

According to an eighth aspect, the present invention relates to a device for communicating on a network having communication devices each able to determine the path to be followed by each item of information which it has to be transmitted, characterised in that it is adapted, when it requires a connection associated with a path, to effect a transmission of information to a destination communication device:

to cause a transmission means to transmit, to each communication device on said path, an item of information requesting the establishment of a connection, and on reception of an item of information on the acceptance of a connection coming from the destination communication device, to cause said transmission means to broadcast, to all the communication devices in the network, an item of information on the establishment of the connection.

The invention also relates to a computer, a camera, a facsimile machine, a photographic apparatus, a television receiver, a printer, a scanner and an audio/video reader, characterised in that they have a device as briefly disclosed above.

The invention also relates to:

an information storage means which can be read by a computer or a microprocessor storing instructions of a computer program characterised in that it allows the implementation of the method of the invention as briefly disclosed above, and an information storage means which is removable, partially or totally, and which can be read by a computer or a microprocessor storing instructions of a computer program characterised in that it allows the implementation of the method of the invention as briefly disclosed above.

The preferential or particular characteristics and the advantages of said device, said computer, said camera, said facsimile machine, said photographic apparatus, said television receiver, said printer, said scanner, said audio/video reader and said information storage means being identical to those of the method as briefly disclosed above, these advantages are not repeated here.

Other advantages and characteristics of the invention will emerge from the following description, given with reference to the accompanying drawings, in which:

DESCRIPTION OF THE PREFERRED EMBODIMENTS

Throughout the present application the terms "communication devices" and "communication means" have the same meaning and designate the same combinations of means which are objects of the present invention.

The preferred embodiment manages three specific service classes, predictive (in connected mode), guaranteed (in connected mode) and elastic (in non-connected mode), on a packet switched network.

Figure 1:
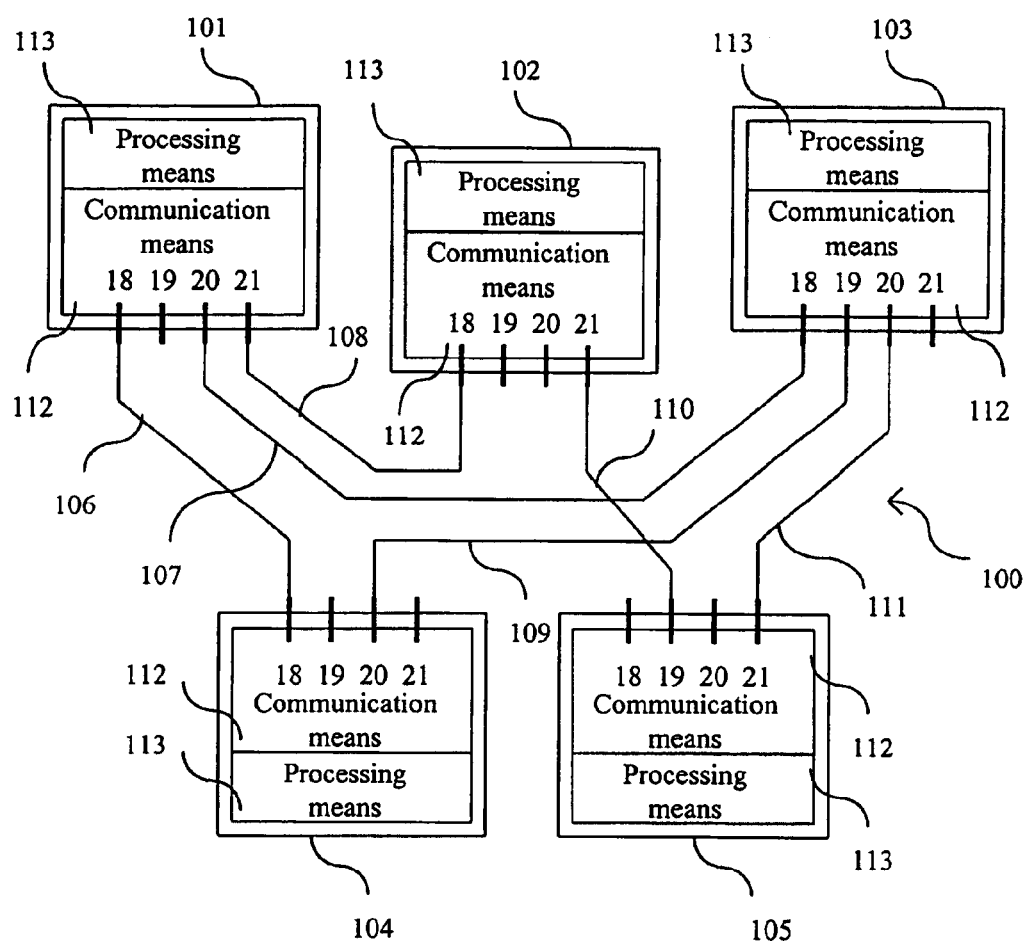
FIG. 1 depicts a network of interconnected nodes.

FIG. 1 shows five items of multimedia equipment 101 to 105 in a packet switched network 100, connected together by six links 106 to 111. Each item of multimedia equipment has a communication means 112 and a data processing means 113. The communication means 112 enables the processing means 113 to open a connection dedicated to connected traffic (predictive or guaranteed real-time traffic) and then to generate this traffic, or else to directly generate a non-connected traffic (elastic traffic).

When the multimedia equipment 101 sends a data packet to the multimedia equipment 105, by means of links 108 and 110, the equipment 101 is a "source" node, the equipment 105 is a "destination" node, the equipment 102, through which the data pass, is an "intermediate" node, whilst the nodes 103 and 104 are "neighboring" nodes, none of the transmitted data passing through either of them.

The embodiment described and depicted concerns a local network composed of several nodes interconnected by fast bidirectional links. Each node has a non-blocking switch having a switching matrix for simultaneous reception and transmission (a cut-through crossbar) and has a certain number of external ports to which links can be connected. In such a network, the route or path followed by a packet is a succession of links, each of the links being defined by the two nodes which it joins.

Communication on such a network is referred to as "switched". An example of such a network is given by a system using components according to IEEE 1355.

Figure 2:
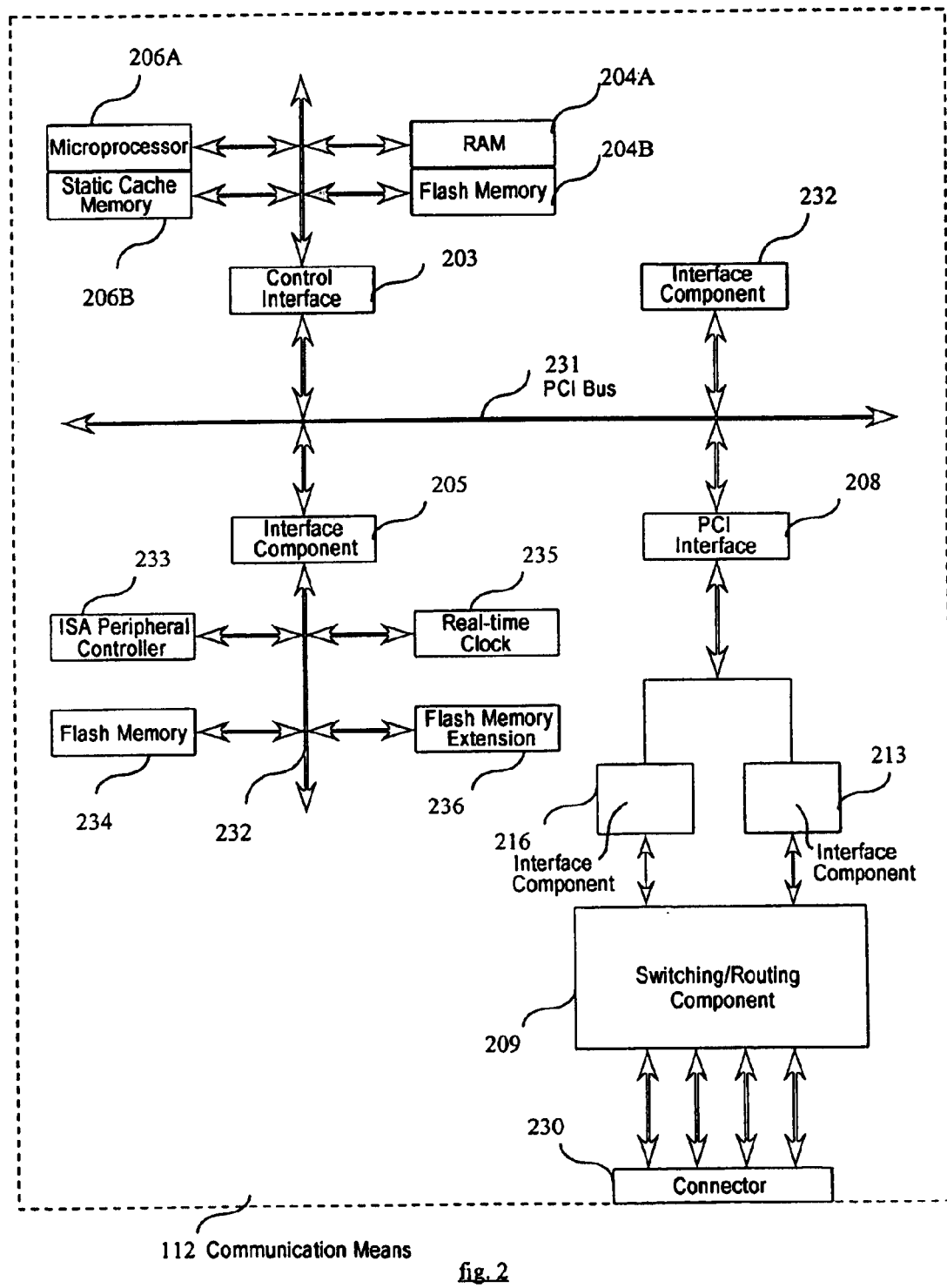
FIG. 2 depicts a communication device (or "means") according to the present invention.

FIG. 2 shows a block diagram of a communication means 112 of the network, having a switching/routing component 209 coupled to a central unit 206 (broken down into two entities 206A and 206B).

The switching/routing component 209, consisting of a component made by SGS-THOMSON (registered trademark), referenced ST C104, has physical ports connected to a connector 230, and two internal ports, one of which is dedicated to control, connected to the central unit 206 by means of different components described below.

It should be noted here that the above-mentioned ST C104 switching/routing component 209 has in fact thirty-two physical ports in addition to two control ports, only one control port and a few physical ports being depicted in FIG. 2. Interface components 213 and 216 are connected to the two internal ports of the switching/routing component 209 and are each based on a component referenced ST C101 manufactured by SGS-THOMSON.

The switching/routing component 209 and the interface components 213 and 216 effect a coding in accordance with IEEE 1355. The switching/routing component 209 has an architecture of the non-blocking type.

Transmitter/receivers, not shown, better known by their technical name of "transceiver", convert TTL signals, on the physical ports of the switching/routing component 209, into differential signals on the connector 230.

The transceivers are for example components made by AT&T (registered trademark) referenced 1141 MK.

The connector 230 is intended to be connected to several identical connectors incorporated in other communication means of the network. They are of the registered trademark HARTING and referenced 2721-121-8000.

The interface components 213 and 216 are connected, by a parallel link, to a PCI interface 208, itself connected to a PCI bus 231. The interface 208 is for example composed of an S5933 AMCC (registered trademark) circuit. The PCI bus 231 is also connected to:

an interface component 232, identical to the component 208, itself connected to the processing means 113 (FIG. 1);

a control interface 203, for example consisting of a component 82439 HX made by INTEL©, itself connected to a central unit local bus 206, having a microprocessor 206A and a static cache memory 206B, and to a dynamic memory 204 (consisting of the two entities 204A and 204B); and an interface component 205, for example referenced 82371 SB made by INTEL ©, this component being connected to an ISA bus which connects an ISA peripheral controller 233, to a BIOS operating system flash memory 234, to a real-time clock 235 and to a flash memory extension 236.

The architecture and components of the communication means 112 are well known to persons skilled in the art of computer systems and are not detailed any further here.

For a better understanding of the constitution of the embodiment described and depicted, the reader is invited to consult the instructions for use of the components, supplied by their respective manufacturers.

The central processing unit CPU 206 is composed of a microcontroller 206A made by INTEL (registered trademark) under the reference PENTIUM (registered trademark) with 32 megabytes of dynamic random access memory DRAM 204 by way of working memory, and 256 kilobytes of static cache memory 206B.

It should be noted here that the expression "memory segment" used below designates, in each of the memories, both a low-capacity memory area (storing only a few binary data) and a large-capacity memory area (for storing a complete program).

The random access memory 204A stores data, variables and intermediate processing results used by the programs stored in memory 204B, in memory segments bearing, in the remainder of the description, the same names as the data whose values they store.

During operation, the flash memory 204B contains the BIOS and the control software packages (which operate with the CHORUS (registered trademark) real-time operating system) which are described in FIGS. 3 to 7.

Figure 9:
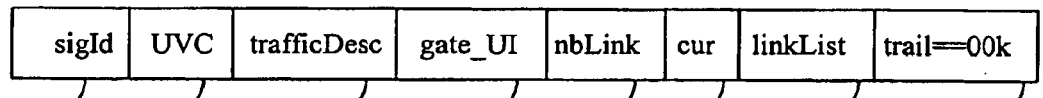
FIG. 9 depicts the structure of control messages intended for managing the connected mode.
Figure 9:
Figure 9:
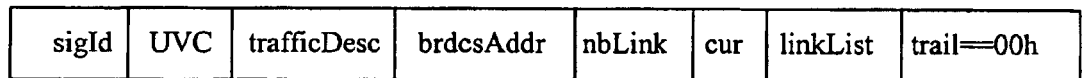
Figure 9:
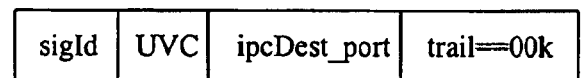
Figure 10:
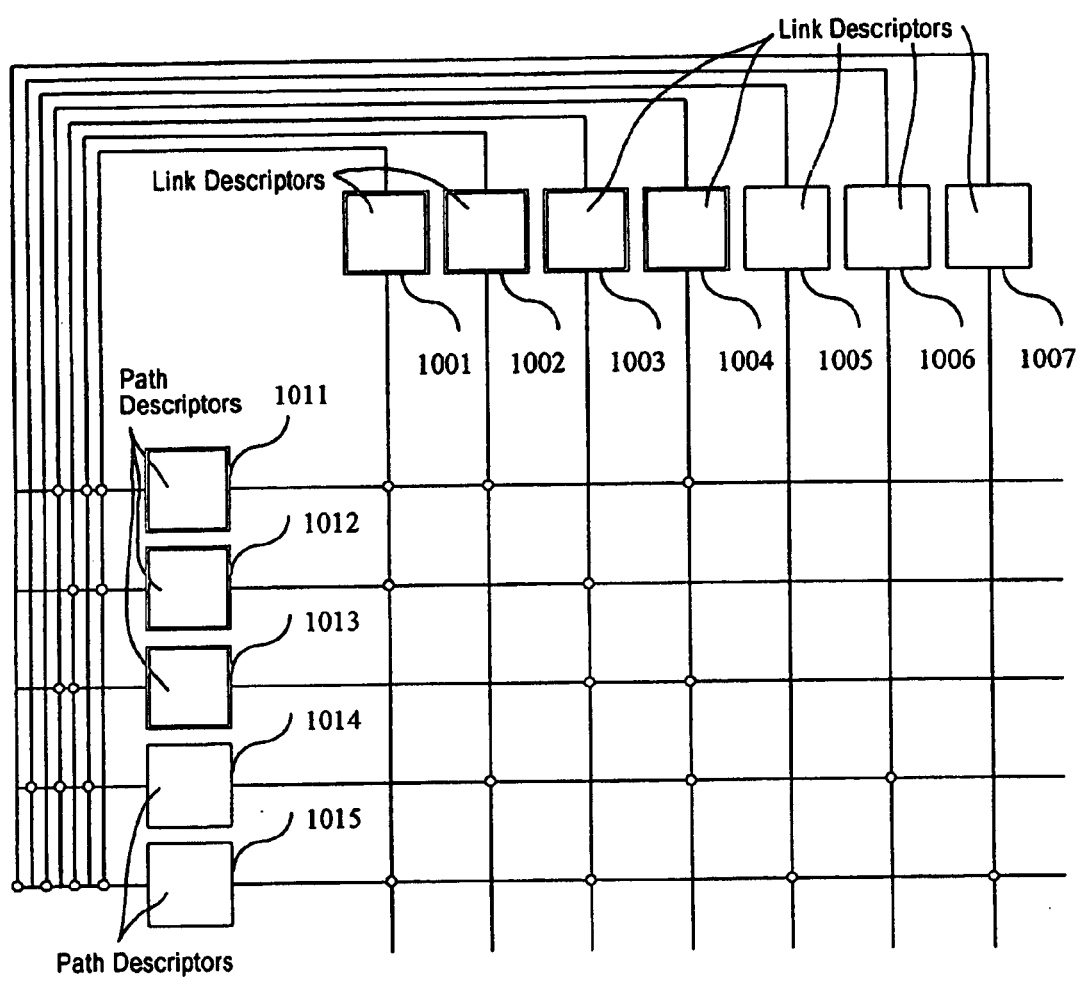
FIG. 10 depicts the data structure of a load table in the memory of a communication means.
Figure 11:
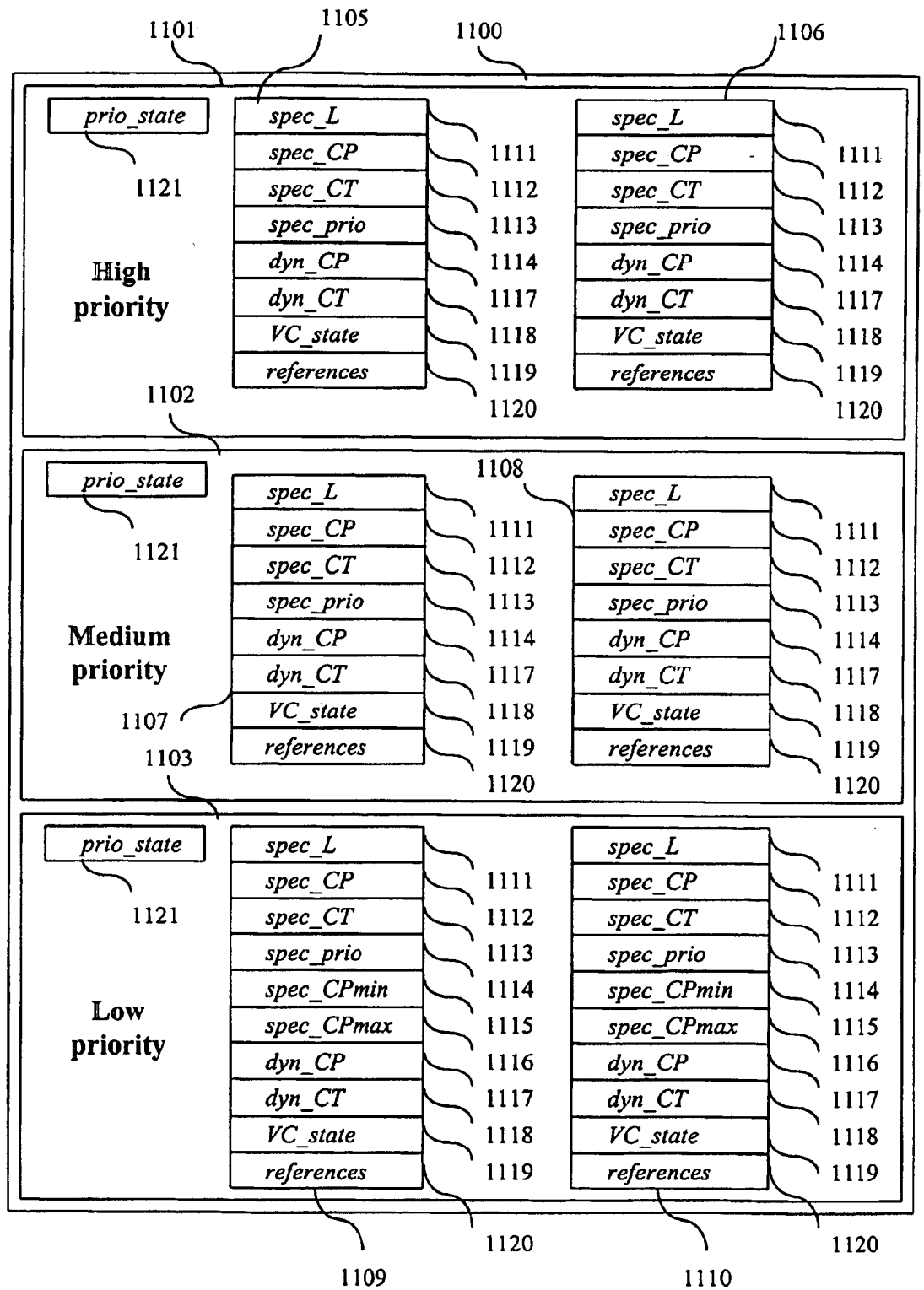
FIG. 11 depicts the data structure of a specification and priority table containing virtual channels reserved for transmission in connected mode, in the memory of a communication means.

The random access memory 204 has notably:

a memory segment "user_data" in which there is stored the user information to be transmitted, including in particular the application requirement (including the necessary passband), a memory segment "add_data" in which there is stored additional information to be transmitted, information which defines notably, in its entirety, the path to be followed by the user data on the communication network (FIG. 9), and a memory segment "Tables" in which there are stored a path load table and a link load table including information describing all the paths of which the node under consideration is the source and all the links forming part of these paths (FIGS. 10 and 11).

The memory extension area 236 is adapted to store:

the operating program of the central processing unit 206, in a memory segment "program 1", and an identifier representing the communication means 112, an identifier which is unique on the communication network.

On initialisation of the communication means, the program stored in the extension memory 236 is at least partially copied and organised in the execution memory area 204B.

The memory extension area 236 constitutes a means of storing information which can be read by a computer or microprocessor, storing instructions of a computer program characterised in that it enables the method of the invention to be implemented. According to a variant, the memory extension area 236 is removable, partially or totally, and includes, for example, a magnetic tape, a flash memory, a diskette or a fixed-memory compact disk (CD-ROM).

In the embodiment described and depicted, the processing means uses the communication means according to the invention. The processing means requires the establishment of a connection to the communication means, indicating to it the application requirement. These so-called "application requirement" parameters are on the one hand transmitted in certain signalling messages and on the other hand used to calculate the traffic parameters. The application requirement is the standard used for updating the load tables in the different nodes of the network since it does not depend on the respective state of the load tables.

The flow diagrams which are the objects of FIGS. 4 to 7 illustrate only partially the operation of the communication devices.

The central processing unit 206 is adapted to implement the flow diagrams described in FIGS. 4 to 7.

Figure 3:
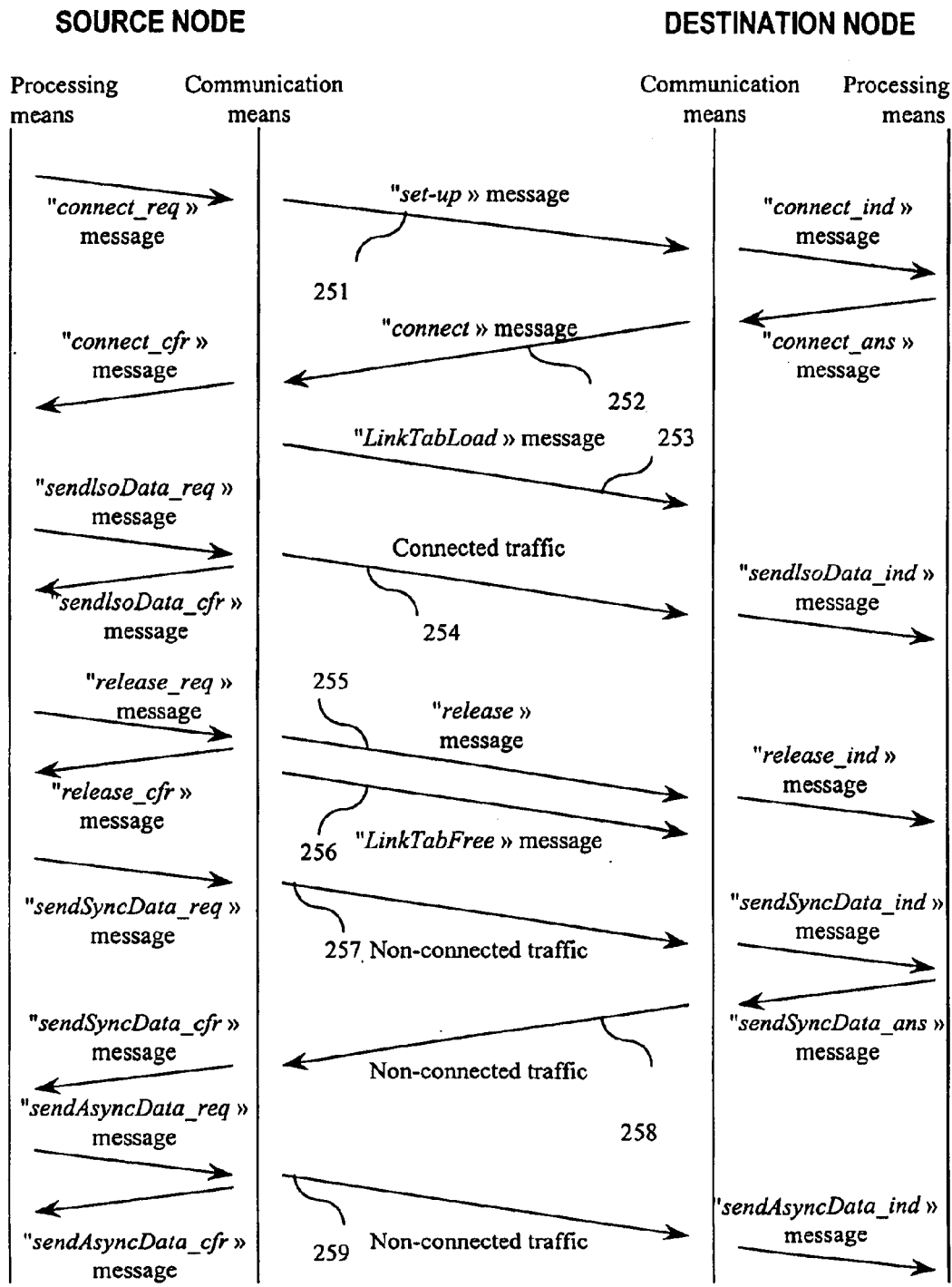
FIG. 3 depicts message exchanges occurring between a source node and a destination node for conveying on the one hand connected traffic and on the other hand non-connected traffic.

FIG. 3 shows, symbolised by downward arrows placed in a central column, messages transmitted over the network, between a source node on the left and a destination node on the right. The arrows oriented from left to right correspond to messages transmitted from the source node for the user data to the destination node for these data, and the arrows oriented from right to left correspond to messages transmitted from the destination node for the user data to the source node for these data.

In the left-hand column, the messages exchanged between the processing means of the source node (on the left) and the communication means of the source node (to the right of the left-hand column) are shown. In the right-hand column the messages exchanged between the processing means of the destination node (on the right) and the communication means of the destination node (to the left of the right-hand column) are shown.

The six arrows 251 to 256 of the central column correspond to a connected communication mode according to the present invention, the arrows 257 and 258 correspond to a transmission in non-connected mode with synchronisation of the two processing means, and the arrow 259 corresponds to a communication in non-connected mode without synchronisation of the two processing means.

In the central column, the arrows 254, 257, 258 and 259 correspond to data transfers on the network, the other arrows corresponding to messages organizing these transfers.

In connected mode, that is to say in the case of connected traffic, the processing means of the source node informs the communication means of the source node of the opening of a connection by sending to it a connection request message ("connect_req").

Consequently the communication means of the source node initiates the initialisation phase ("set-up"). This phase includes notably the sending of an initialisation message 251 (message "set-up") by the communication means of the source node to the communication means of the destination node (by means, where applicable, of the communication means of each intermediate node).

On reception of the "set-up" message, the communication means of the destination node informs the processing means of the destination node that it has received a request to open a connection, by means of a connection request message "connect_ind".

Figure 6:
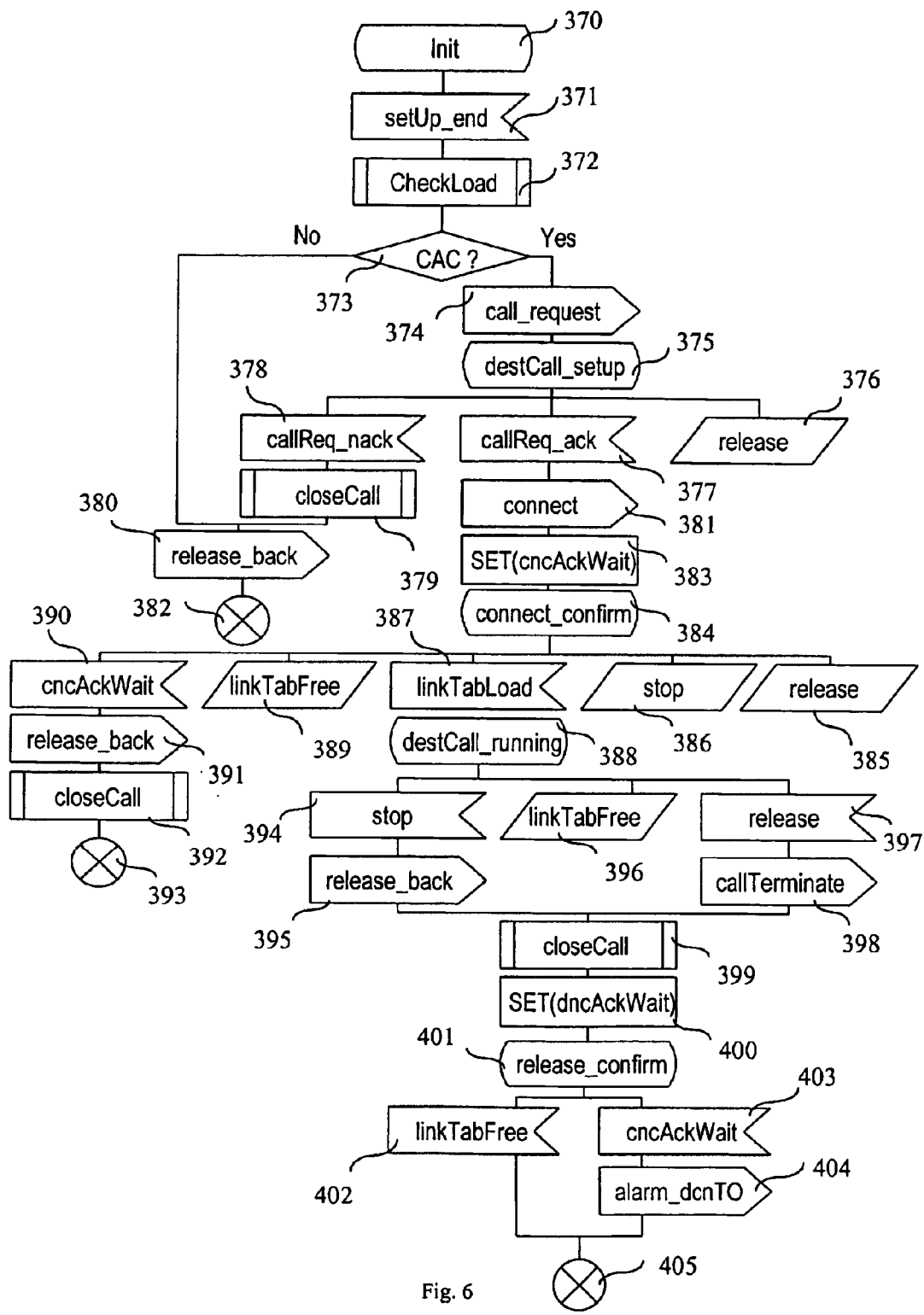
FIG. 6 depicts a flow diagram implemented by a communication means of a so-called "destination" node for a transmission in connected mode.

If the request is accepted, the communication means of the destination node is informed by the processing means of the destination node, by means of a message "connect_ans" (identified in FIG. 6 by the name "callRequest_ack" for acceptance of a call request or "callRequest_nack" for rejection of the call request, depending on the result of the connection-opening request, operations 377 and 378 respectively. In the first case, a connection message 252 ("connect") is sent by the communication means of the destination node to the communication means of the source node.

The processing means of the source node is then informed of the correct unfolding of the opening of the connection by a connection confirmation message "connect_cfr", from the communication means of the source node. The communication means of each node in the network is then informed of the establishment of a new connection by means of a message 253 updating the load table "LinkTabLoad" broadcast by the communication means of the source node. This message is also used for confirming, to the intermediate nodes and destination node, the correct unfolding of the connection establishment phase.

The transfer of data making up the connected traffic associated with the connection, from the source node to the destination node, can then take place. To this end, the processing means of the source node and the communication means of the source node exchange messages requesting the sending of a data message "sendIsoData_req" and confirming the sending of the data message "sendIsoData_cfr".

The data messages 254 are then transferred after segmentation of the data stream into packets of predefined size. The communication means of the destination node receives the data packets, which it entrusts to the processing means of the destination node, by means of the data message reception message "sendIsoData_ind"), after having restructured the data stream.

When the data to be transmitted have been transmitted, the processing means of the source node can decide on the release of a connection by transmitting a connection release request message "release_req" to the communication means of the source node.

The communication means of the source node then sends:

a release confirmation message "release_cfr" to the processing means of the source node, a release message "release" 255 to any intermediate nodes and the destination node, and a message 256 updating the load table "LinkTabFree" to all the nodes in the network.

The message 256 is used for confirming, to the intermediate nodes, the neighboring nodes and the destination node, the correct unfolding of the connection release phase. At the destination node, the communication means informs the processing means of the release of the connection by means of a connection release notification message "release_ind".

The data transfer for the elastic traffic, in non-connected mode with synchronisation of the processing means, takes place without prior opening of a connection, by the transmission of the message sending message "sendSyncData_req" by the processing means of the source node to the communication means of the source node. This communication means effects the transfer 257 of the data after segmentation of the data stream into packets of predefined size. At the destination node, the reception of the data is effected by the communication means, which informs the processing means, and transmits the restructured data stream, by the use of the message reception message "sendSyncData_ind". In response, the processing means of the destination node sends, to the communication means of the destination node, a correct-reception message "sendSyncData_ans", which contains the answer of the processing means of the destination node and causes the transfer of a message 258 between the communication means of the destination node and the communication means of the source node. On reception of this message 258, the communication means of the source node sends, to the processing means of the source node, a transmission confirmation message "sendSyncData_cfr".

The data transfer for elastic traffic, in non-connected mode without synchronisation of the processing means, takes place without prior opening of a connection, by the transmission of the message-sending message "sendAsyncData_req" by the processing means of the source node to the communication means of the source node. This communication means effects the transfer 259 of the data after segmentation of the data stream into packets of predefined size and sends, to the processing means of the source node, a transmission-confirmation message "sendAsyncData_cfr". At the destination node, the reception of the data is effected by the communication means, which informs the processing means and transmits the restructured data stream, by the use of the message reception message "sendAsyncData_ind".

FIGS. 4 to 7 illustrate the procedures for managing the connections according to the invention.

With regard to the communication means of the source node, after having been in an initialization state 300 (FIG. 4), an incoming message "connect_req" is received during an operation 301, from the processing means of the source node. This message includes the application requirement, including the passband and the transmission mode. The communication means of the source node then selects a path allocated to the connection, calculates the traffic parameters according to the application requirement and then updates the load table if a path is available (FIG. 13), during an operation 302.

Next, during a test 304, the communication means of the source node determines whether or not the passband required for the envisaged connection is available on the selected path. This test procedure 304 is known as "connection acceptance control" or "CAC". When the result of the test 304 is negative, during an operation 303, the communication means sends a message (negative message "connect_cfr") refusing opening of a communication to the processing means of the source node. This negative refusal message "connect_cfr" has the effect of warning the software application which required the transmission that it is impossible to effect this transmission in connected mode.

Next, the resources associated with the management of the connection are released.

When the result of test 304 is positive, during an operation 305, the communication means sends the message 251 "set-up" (FIG. 3) to the communication means of the destination node, by means of each of the communication devices of any intermediate nodes. This message 251 describes the connection to be established (see FIG. 9).

Next, during an operation 306, a clock counter (timer) "cncAckWait" is initialized to a value which corresponds to a maximum period allocated to the establishment of the requested connection. The communication means then goes into a state of awaiting the answer from the network with regard to the establishment of the connection, state 307.

In this state 307, three different events may occur, during operations 308, 310 or 311.

When, in the state 307, the incoming message is a message "cncAckWait", coming from the change to zero of the value of the clock signal counter "cncAckWait" initialized during operation 306, operation 308, or when the incoming message is a message "release_back", coming from the destination node or from one of any intermediate nodes, operation 310, the operation 323 is performed, during which the processing means of the source node is informed that the connection request is rejected. To this end, the communication means of the source node sends a message "openCall_nack", corresponding to a negative message "connect_cfr", notifying the rejection of the connection, to the processing means of the source node.

Following the operation 323, during an operation 324, the communication means of the source node updates the load tables associated with the connection which was rejected. Then, during an operation 325, the resources associated with management of the connection are released.

Finally, when, in state 307, the incoming message is a connection message 252 "connect", coming from the destination node, operation 311, the communication means of the source node sends a message acknowledging the opening of a connection "openCall_ack", corresponding to a positive message "connect_cfr", to the processing means of the source node, operation 312, and then, during an operation 313, broadcasts a message 253 "LinkTabLoad" including notably the description of the application requirement, the passband used and the description of the path corresponding to the connection, in terms of links. This message is broadcast to all the nodes in the network, which has the effect that each node in the network updates its load tables. This message is broadcast in accordance with a network spanning tree, determined according to known techniques (see FIG. 8).

The communication means of the source node then goes into the state 314 during which it awaits a change in the connection and transmits all the data intended to be transmitted in connected mode, over the connection set up.

Two messages can then come into the communication means, during operations 315 and 318.

When, in the state 314, the incoming message is a release message coming from another node in the network "release_back", operation 315, the communication means of the source node sends a communication termination message "callTerminate", "release_ind" FIG. 3, to the processing means of the source node, operation 316, which has the effect of informing the processing means of the release of the connection.

Then the communication means sends an alarm message "alarm_dcnBack", operation 317, to the processing means of the source node, which has the effect of triggering the processing of an alarm by this processing means since the connection has been interrupted in an abnormal fashion. Then the communication means broadcasts, to all the other nodes in the network, a load table update message "LinkTabFree", including notably a description of the application requirement and of the path corresponding to the connection, in terms of links, operation 320.

The communication means then performs an operation 321, identical to the operation 324, and then an operation 322 during which the resources associated with the management of the connection are destroyed.

When the message received, in state 314, is a message requesting the end of a connection (message "release_req" coming from the processing means of the source node and a message "release_cfr", in response), operation 318, the communication means sends a release message 255 "release", operation 319, and then performs operations 320, 321 and 322.

With regard to each intermediate node (FIG. 5), after having been in an initialisation state 300, an incoming message 251 "set-up" is received during an operation 331, from the source node (see operation 305). The application requirement for the connection under consideration is then extracted from this message 251 "set-up". The communication means of the intermediate note then calculates the traffic parameters, from the application requirement, and then, if the load is acceptable, updates these load tables, during an operation 332, detailed in FIG. 14.

Next, during a test 335, the communication means of the intermediate node determines whether or not the passband required for the connection envisaged is available on the selected path (see test 304).

When the result of test 335 is negative, during an operation 333, the communication means of the intermediate node sends a connection release message "release_back" to the source node (see operation 310). Then the communication means of the intermediate node releases the resources associated with the management of the connection under consideration, operation 334.

When the result of test 335 is positive, during an operation 336, the communication means sends an initialisation message "set-up" 251 to the communication means of the destination node and to each of the communication means of any intermediate nodes. This message is sent after updating of the field identifying the position of the node in the path, from the description of the path in terms of links (see FIG. 9).

Next, during an operation 337, the timer "cncAckWait" is initialised to a value which corresponds to the maximum period allocated to the establishment of the connection. The communication means then goes into the state 338 of awaiting the answer from the network with regard to the establishment of the connection.

In this state 338, five different events may occur, during operations 339, 341, 345, 346 and 347.

When the incoming message is a message "cncAckWait", coming from the change to zero of the value of the clock signal counter "cncAckWait" initiated during operation 337, operation 339, the communication means sends a release message "release", operation 340, to the destination node and any intermediate nodes which separate it from the destination node, and sends a release message "release_back" to the source node and any intermediate nodes which separate it from the source node, operation 342. Next, during an operation 343, the communication means of the intermediate node under consideration updates the load tables associated with the connection which was rejected. Then, during an operation 344, the resources associated with the management of the connection are released.

When the incoming message is a message "release" 255, coming from the source node or an intermediate node between the source node and the intermediate node under consideration, operation 341, the communication means performs operations 342 to 344.

When, in state 338, the incoming message is a message 256 "LinkTabFree", operation 347, this message is stored and the communication means remains in state 338.

When, in state 338, the incoming message is a message requesting the end of the connection sent by a node control means, whose function is to take into account the different problems on the network, operation 346, this message is stored and the communication means remains in state 338.

Finally, when the incoming message is a message 253 "LinkTabLoad", including notably the description of the application requirement, as well as the description of the path in terms of links, coming from the source node (see operation 313), operation 345, the communication means goes into a state 348 during which it awaits a change in the connection and transmits all the data intended to be transmitted in connected mode, over the connection set up.

It should be noted here that the function of the message 253 "LinkTabLoad", vis-à-vis an intermediate node (and the destination node), is to confirm the establishment of the connection during operation 345.

In the state 348, three events may occur, during operations 349, 350 and 351.

When, in state 348, the incoming message is a message 256 "Link TabFree", operation 351, this message is stored and the communication means remains in state 348.

When, in state 348, the incoming message is a message 255 "release", the operation 353 described below is performed.

Finally, when, in state 348, the incoming message is a message requesting the end of the connection, sent by a node control means, operation 350, the communication means sends a release message "release_back" to the source node, operation 352.

Following one of the operations 349 or 352, the communication means effects, during an operation 353, the sending of a release message "release" to the destination node and of each and any intermediate node which may separate the intermediate node in question and the destination node.

The communication means then performs an operation 354 identical to operation 324, and then an operation 355 during which the timer "cncAckWait" is initialized to a value which corresponds to the maximum period allocated to the release of the connection. The communication means then goes into the state 356 of awaiting the answer from the network with regard to the release of the connection.

In state 356, two messages may arise, during operations 357 and 358.

When the incoming message is a message 256 "LinkTabFree", operation 357, the resources associated with the management of the connection are released, operation 360.

When, in state 356, the incoming message is a message "cncAckWait", resulting from the change to zero of the value of the clock signal counter "cncAckWait" initialized during operation 355, operation 358, the communication means sends an alarm message "alarm_dcnTO", operation 359, to a node control means, which has the effect of triggering the processing of an alarm by this processing means since the connection has not been released in a normal fashion.

Following one of operations 357 or 359, the resources associated with the management of the connection are released, operation 360.

With regard to the destination node (FIG. 6), after having been in an initialisation state 370, an incoming message "setUp_end" is received during an operation 371, from the source node or an intermediate node. The communication means of the destination node then extracts the application requirement, operation 371, then calculates the traffic parameters from the application requirement and, if the load is acceptable, updates the load table during an operation 372 similar to operation 332, described in FIG. 14.

Next, during a test 373, the communication means of the destination node determines whether or not the passband required for the envisaged connection is available on the path selected (see tests 304 and 335).

When the result of test 373 is negative, during an operation 333, the communication means of the destination node sends, to the source node and any intermediate nodes, a release message "release_back", during an operation 380. Next, the resources associated with the management of the connection are released, operation 382.

When the result of test 373 is positive, the communication means of the destination node sends, to the processing means of the destination node, a connection request message "connect_ind", during an operation 374.

Then the communication means goes into a state 375 of awaiting the answer from the processing means of the destination node.

In state 375, three events may occur, during operations 376, 377 and 378. When the incoming message is a release message "release", coming from the source node or one of the intermediate nodes, it is stored during operation 376.

When, in state 375, the incoming message is an unfavourable answer "callReq_nack", corresponding to a negative message "connect_ans" (FIG. 3), coming from the processing means of the destination node, operation 378, during an operation 379, the communication means of the destination node updates the load tables associated with the connection which has been rejected. Then operations 380 and 382 are performed.

Finally, when, in state 375, the incoming message is a favourable message "callReq_ack", corresponding to a positive message "connect_ans" (FIG. 3), coming from the processing means of the destination node, operation 377, the communication means sends a message 252 "connect", directly to the source node, using the routing means, during an operation 381. Next, during an operation 383, the timer "cncAckWait" is initialised to a value which corresponds to a maximum period allocated to the establishment of the requested connection. The communication means then goes into the state of awaiting the answer from the network with regard to the establishment of the connection, state 384.

In this state 384, five events may occur during operations 385, 386, 387, 389 and 390.

When the incoming message is a release message "release", coming from the source node or from one of the intermediate nodes, it is stored during operation 385.

When, in state 384, the incoming message is a message to update the load table 256 "LinkTabFree", coming from the source node, it is stored during operation 389.

When, in state 384, the incoming message is a message requesting the end of a connection coming from the processing means or from a node control means, it is stored during operation 386.

When, in state 384, the incoming message is a message "cncAckWait", resulting from the change to zero of the value of the clock signal counter "cncAckWait" initialised during operation 383, operation 390, the communication means sends a connection release message "release_back", operation 391, to the intermediate nodes and source node.

Next, during an operation 392, the communication means of the destination node updates the load tables associated with the connection which was rejected. Then, during an operation 393, the resources associated with the management of the connection are released.

Finally, when, in state 384, the incoming message is a message 253 "LinkTabLoad", a message including notably the description of the application requirement and the description of the path in terms of links (a message whose function is to confirm the establishment of the connection), operation 387, the communication means of the destination node goes into a state 388 of awaiting a change in the connection.

It should be noted here that the function of the message 253 "LinkTabLoad" is, vis-à-vis the intermediate node, to confirm the establishment of the connection.

In the state 388, three events may occur, during operations 394, 396 and 397.

When, in state 388, the incoming message is a message to update the load table 256. "LinkTabFree", coming from the source node, it is stored during operation 396.

When, in state 388, the incoming message is a release message 255 "release", operation 297, the communication means effects the notification "callTerminate", corresponding to a message "release_ind" (FIG. 3), of the break in the connection to the processing means of the destination node, operation 398. Next, the operation 399 described below is performed.

Finally, when, in state 388, the incoming message is a message requesting the end of a connection sent by a node control means, operation 394, the communication means sends a release message "release_back" to the source node and intermediate nodes, operation 395.

Following one of the operations 395 or 398, the communication means performs an operation 399 identical to operation 324, then an operation 340 during which the timer "cncAckWait" is initialised to a value which corresponds to the maximum duration allocated to the release of the connection. The communication means then goes into the state 401 of awaiting the answer from the network with regard to the release of the connection in the same way as for the intermediate nodes.

In state 401, two messages may arise, during operations 402 and 403.

When the incoming message is a message 256 "LinkTabFree", operation 402, the resources associated with the management of the connection are released, operation 405.

When, in state 401, the incoming message is a message "cncAckWaif", resulting from the change to zero of the value of the clock signal counter "cncAckWaif" initialised during operation 400, operation 403, the communication means sends an alarm message "alarm_dcnTO", operation 404, to the node control means, which has the effect of triggering the processing of an alarm by this processing means since the connection has not been released in a normal fashion.

Following one of operations 402 or 404, the resources associated with the management of the connection are released, operation 405.

With regard to each neighbouring node (FIG. 7), after having been in an initialisation state 411, the communication means of the neighbouring node receives a message 253 "LinkTabLoad", comprising notably the description of the application requirement and the description of the path in terms of links, operation 412. Next, during an operation 413, the communication means of the neighbouring node calculates the traffc parameters from the application requirement and then, independently of the load, updates the load table.

Next, in state 414, the communication means of the neighbouring node awaits the change in the connection. Next, during an operation 415, it receives a message 256 "LinkTabFree" concerning the connection, a message comprising notably the description of the application requirement and the description of the path in terms of links.

Next, during an operation 416, the communication means of the neighboring node updates the load tables associated with the connection which has been released. Then, during an operation 417, the resources associated with the management of the connection are released.

It should be noted here that the purpose of the message 253 "LinkTabLoad" is, vis-à-vis a neighboring node, to give information about the establishment of the connection.

Thus the procedure (FIG. 7) corresponds to a notification rather than to an acceptance control.

Figure 8:
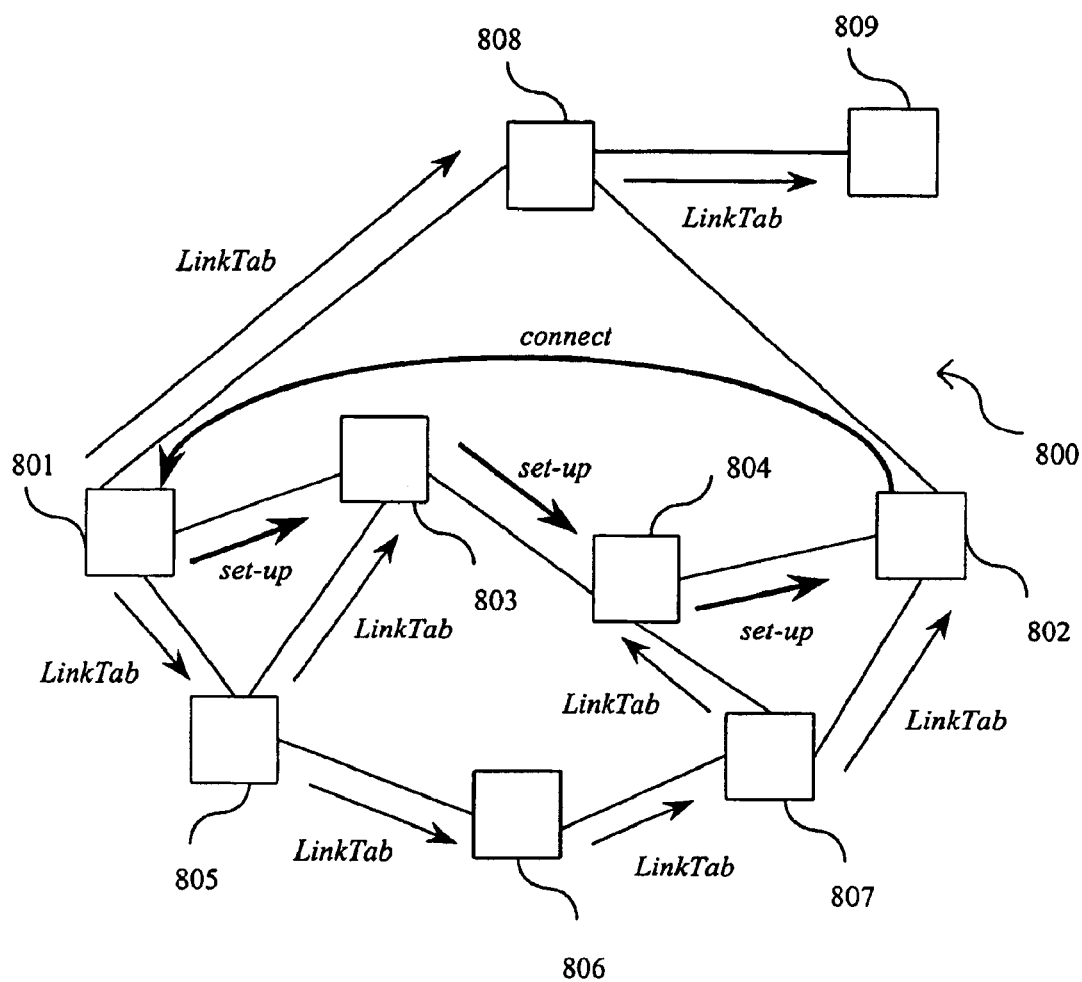
FIG. 8 depicts a network on which control messages flow, which are intended for the management of the connected mode.

FIG. 8 depicts, in a packet switched network 800:

a source node 801, a destination node 802, two intermediate nodes 803 and 804, five neighboring nodes 805 to 809, and the links between these nodes.

Along these links messages, passing successively over the network thus formed, are depicted in the form of arrows.

It will be noted that the message 251 "set-up" circulates:

from the source node 801 to the intermediate node 803, then from the intermediate node 803 to the intermediate node 804, then from the intermediate node 804 to the destination node 802.

On the other hand, the message 252 "connect" returns directly from the destination node 802 to the source node 801, without the intervention of the intermediate nodes 803 or 804. This message 252 can in fact pass by any path between the destination node and the source node, for example by a path passing through the neighboring node 808.

Finally, the load table update messages 253 "LinkTabLoad" and 256 "LinkTabFree" are broadcast to all the nodes in the network, in accordance with a spanning tree.

Preferentially, all the ends, or "leaves" of the spanning tree are situated on the path of the connection. Thus, when there is a fault in the network, the nodes on the path, intermediate nodes or destination nodes, which, as has been seen in the flow diagrams of FIGS. 5 and 6, await the message "LinkTabLoad" 253, respectively in the states 345 and 387, can detect the fault when one of the neighboring nodes does not transmit this message.

FIG. 9 shows, on four successive lines, the structures of the messages 251 "set-up", 255 "release", for updating the load table, 253 "LinkTabLoad" or 256 "LinkTabFree" and 252 "connect".

The message 251 "set-up" includes successively the fields:

901, identification of the type of message ("set-up", "LinkTabLoad", "LinkTabFree", "Connect" or "Release", see FIG. 3), 902, identification of connection, 903, description of traffic, representing the application requirement, 904, data peculiar to the communication means making it possible notably to identify the processing means of the source and destination nodes, 905, number of links which use the path associated with the connection, 906, ranking of the link over which the message passes, on the path associated with the connection, 907, descriptors of successive links on the path corresponding to the required connection, and 908, protocol data.

The message 255 "release" includes successively the fields:

901, identification of the type of message ("set-up", "LinkTabLoad", "LinkTabFree", "Connect" or "Release", see FIG. 3), 902, identification of connection, 909, reason for the release request, 905, number of links which use the path associated with the connection, 906, ranking of the link on which the message passes, on the path associated with the connection, 907, descriptors of successive links on the path corresponding to the required connection, and 908, protocol data.

A load table update message 253 or 256 includes successively the fields:

901, identification of the type of message ("set-up", "LinkTabLoad", "LinkTabFree", "Connect" or "Release", see FIG. 3), 902, identification of connection, 903, description of traffic, representing the application requirement, 910, information relating to the spanning tree used, 905, number of links which use the path associated with the connection, 906, ranking of the link on which the message passes, on the path associated with the connection, 907, descriptors of successive links on the path corresponding to the required connection, and 908, protocol data.

The message 252 "connect" includes successively the fields:

901, identification of the type of message ("set-up", "LinkTabLoad", "LinkTabFree", "Connect" or "Release", see FIG. 3), 902, identification of connection, 911, protocol data, which can be used by the processing means of the source node, 908, protocol data.

FIG. 10 shows link descriptors 1001 to 1007 disposed side by side and path descriptors 1011 to 1015 disposed on successive lines.

Each path descriptor is a data structure for the description of a path which includes, in particular, the reference of the links involved in the description of this path and the reference of each connection associated with this path. Each outgoing path descriptor (1011, 1012 or 1013) concerns a path created by the routing means of the communication means.

The paths which do not start from the node under consideration are referred to as "temporary" and make it possible to know the loads on the links on the outgoing paths. The temporary paths are created by the load control means, which manages all the paths (operations 1307, 1407 and 1504, FIGS. 13 to 15).

In the embodiment described and depicted, the paths 1011, 1012 and 1013 are outgoing paths (in bold lines) and the paths 1014 and 1015 are temporary paths (in fine lines). The paths 1011, 1012 and 1013 describe the routing table and are used by the node under consideration to establish paths to any destination node.

Each link descriptor 1001 to 1007 includes, in particular, the reference of each path which passes through the link under consideration, identified by a rectangle, at the intersection of a vertical line starting from the link descriptor under consideration and a horizontal line starting from the path descriptor under consideration.

The links 1001 to 1004 form part of at least one of the outgoing paths, and are depicted in bold lines. Each intersection of two lines marked by a dot represents a reference in memory:

the external lines (at the top and/or to the left of the rectangles) mark the references stored with each link: these references concern each path which passes through said link, and the internal lines (at the bottom and/or to the right of the rectangles) mark the references stored with each path: these references concern each link through which said path passes.

The updating of the load table effected by the load control means includes the following steps:

for establishing a connection:
updating the load for all the links referenced by the path (addition of load), and
for each link, updating of the load on each path referenced for this link;

for withdrawing a connection:
updating the load on all the links referenced by the path (deduction of load), and
for each link, updating the load on each path referenced for this link;

for adding a path:
either by the routing means, when the routing table of the node under consideration is established (it is then an outgoing path), or when the routing table is updated,
or by the load control means, when the path associated with a new connection when a load is added is not already specified (it is then a temporary path);

for eliminating a path:
by withdrawing a temporary path when a connection no longer passes through it, after withdrawing a connection, or when the list of connections referenced by this path is empty,
for converting an outgoing path into a temporary path when it no longer forms part of the routing table (following an operation of updating the routing table); and for eliminating a link:
by withdrawing a link when it no longer has any path passing through it, or when the list of paths referenced by said link is empty.

In the load table, an item of load information is associated with each link and an item of information representing the least available link is associated with each path. Thus the available passband of the least available link is also the available passband of the path.

It should be noted that it is by using this path passband availability information that the communication means chooses the path by choosing the most available path. For each item of information to be transmitted in non-connected mode, the availability of each path in the network is thus estimated, as a function of the traffic in connected mode.

The load on a path is defined from its least available link. It is characterised by the total passband which it allows and the maximum share of the passband associated with the traffic in connected mode. Given the actual load of the traffic in connected mode, each communication means defines the share associated with the traffic in non-connected mode as being equal to the total passband from which the share associated with connected mode was subtracted.

The communication means allocates to all the transmissions in non-connected mode which it has to effect, all or part of the passband (preferentially a part, in order to avoid network congestion problems). This share is equitably distributed between all the transmissions in non-connected mode and is therefore dynamically updated at the start and end of each transmission in connected mode (when the connected-mode traffic load varies).

A share is allocated by defining a range of values of the number of packets to be sent between two extreme values (spec_CPmin 1114 and spec_CPmax 1115 (FIG. 11). This passband allocation operation is performed before the sending of the information 257 or 259 (FIG. 3).

In addition, it is considered that a path which supports more than a predetermined number of outgoing transmissions in non-connected mode is not available for a supplementary transmission in non-connected mode.

Events which may influence the allocation of a passband to a transmission in connected mode are of two types:

those which concern the connected mode, the establishment or closure of a connection, and which have an influence on the passband which is reserved for it and, consequently, on the number of packets to be sent in non-connected mode but also on the size of these packets, and those which concern the non-connected mode, the start or end of a transmission, and which have an influence on the number of packets to be sent in non-connected mode.

For managing the load table illustrated in FIG. 10, the load on a path is determined by the load on the least available link, taking into account, for the load on a link, the sum of the loads on the paths which pass through it.

The outgoing paths used are established by a routing means of a known type.

It should be noted here that each node in the network controls the flow which it generates and that the information enabling these flows to be controlled is established from the load table which is shared between the different nodes, each node storing this information in the form of a table such as the one illustrated in FIG. 11.

The priority levels of the messages are established by the processing means from the application requirement.

In FIG. 11, a table 1100 can be seen, including three lines 1101, 1102 and 1103, each of the lines including specifications of virtual channels 1105 to 1110.

It should be stated here that each virtual channel is a logic entity associated with a communication between two applications used by two processing means associated with two communication means.

In the table in FIG. 1, it has been chosen to depict two virtual channels for each priority level, for reasons of clarity. However, for each priority level, the number of virtual channels can vary between zero and a predetermined number.

Each of these specifications includes:

an item of information representing the size "spec_L" 1111 of the packets associated with the channel;

an item of information representing the number of packets to be sent "spec_CF" 1112 during the primary interval of time under consideration;

an item of information representing the duration "spec_CT" 1113 of the primary interval of time under consideration;

an item of information representing the priority level (high, medium or low) "spec_prio" 1114 associated with the channel;

an item of information "dyn_CP" 1117 representing the number of packets actually sent over the virtual channel, during the primary interval of time under consideration;

an item of information "dyn_CT" 1118 representing the number of secondary intervals of time elapsed during the primary interval of time under consideration; and an item of information "VC_state" 1119 representing the state in which the virtual channel is, "free", "active"or "asleep" (see FIG. 12); and an item of information "references" 1120 representing the positions (or references), in memory, of the user data to be transmitted.

In addition, the specifications of the low priority level include:

an item of information "spec_CPmin" 1115 representing the minimum value of the number of packets to be sent "spec_CP" 1112—an item of information "spec_CPmax" 1116 representing the maximum value of the number of packets to be sent "spec_CP" 1112, in order to make it possible to decrease the value of "spec_CP" 1112 during the operation 1221 or to increase it during operation 1215, within these limits spec_CPmin 1115 and spec_CPmax 1116.

Finally, each line, or priority level, is allocated an item of information "prio_state" 1120 representing the state in which all the virtual channels of the priority level under consideration are: when no channel is at the priority level under consideration, the priority level is "free", when all the channels in the priority level are in a state "asleep", the priority is itself in a state "asleep" and in the other cases the priority level is "active".

The table of specifications and priorities 1100 is formed by placing:

on the first line 1101 ("high" priority level) all the virtual channels allocated to transmissions in connected mode, or "predictive real time";

on the second line 1102 ("medium" priority level) all the virtual channels allocated to transmissions in guaranteed real-time connected mode;

on the third line 1103 ("high" priority level) all the virtual channels allocated to transmissions in non-connected mode (known as "asynchronous" and "elastic").

Thus all the nodes have a priority table relating to the traffic which it can generate, and each takes care of the messages of which it is the source (the principle known as "outgoing traffic").

It should be noted here that the traffic parameters are determined by the load control means from the content of the load table. Consequently, the traffic parameters associated with the high and medium priority virtual channels 1101 and 1102 are calculated from an a priori knowledge on all the connected traffic whereas the traffic parameters associated with the low priority virtual channels 1103 are estimated from a knowledge limited to the non-connected traffic leaving the node under consideration.

Figure 12:
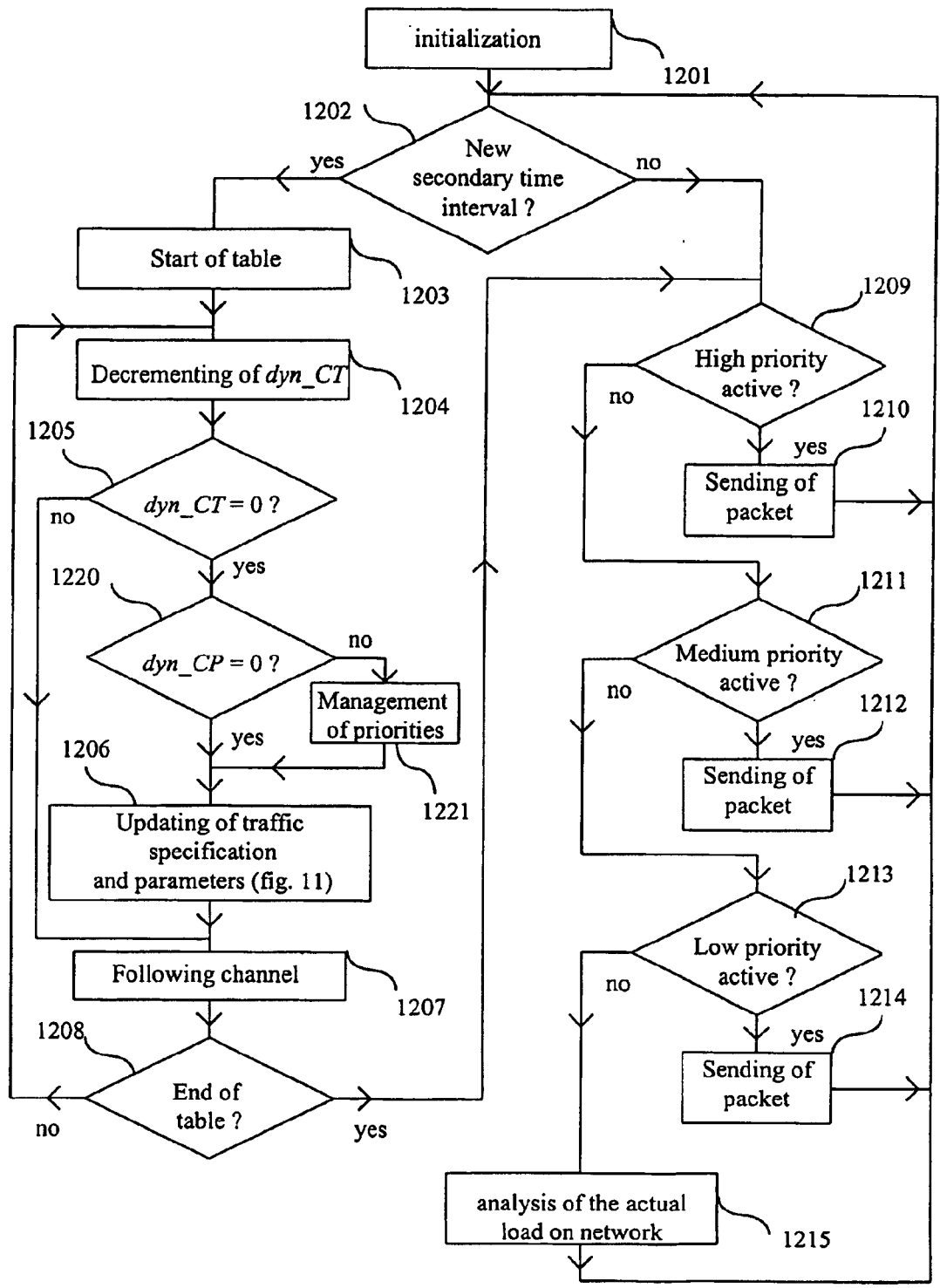
FIG. 12 depicts a flow diagram for transmitting in connected and non-connected modes of a communication means as illustrated in FIG. 2.

FIG. 12 depicts an operating flow diagram for sending in connected and non-connected modes of a communication means as illustrated in FIG. 2. This flow diagram is implemented by the central unit 206 (FIG. 2).

The operating principle used is that the order of sending of the packets is based on the filling of a primary time interval IT-P, comprising secondary time intervals IT-S.

Following the operation 1201 of initialization by resetting all the variables to zero, a test 1202 determines whether a secondary time interval has elapsed, the start of a secondary time interval being determined from the real time clock 235. When the result of test 1202 is positive, during an operation 1203, the central unit 206 places itself at the start of the specification and priority table (FIG. 11).

Next, during an operation 1204, the information "dyn_CT" 1118 of the virtual channel under consideration is decremented. Then, during a test 1205, the central unit 206 determines whether or not the value of the information "dyn_CT" 1118 of the virtual channel under consideration is equal to zero. When the result of test 1205 is positive, that is to say at the end of a primary time interval, during a test 1220, the central unit 206 determines whether or not the value of the information "dyn_CP" 1117 is equal to zero. The test 1220 therefore corresponds to each start of a new primary time interval.

When the result of test 1220 is negative, during an operation 1221, the central unit 206 manages the priorities in the following fashion:

for the predictive traffic, high-priority, the packets not transmitted during the required time interval, whose number is equal to the value with the value "dyn_CP" 1117, are eliminated (loss of packets), and then the value "dyn_CP" 1117 is set to zero, and for the guaranteed traffic, medium priority, the packets not transmitted during the time interval are stored and "dyn_CP" 1117 stores its value, and for the elastic traffic, low priority, the passband is reduced, by decrementing the value "spec CP" 1112 within the permitted limits.

Following operation 1221 or when the result of test 1220 is positive, an operation 1206 is performed.

During the operation 1206, the traffic specifications and parameters are updated (see FIG. 11):

the information 1111 to 1113 and 1115 to 1116 is updated at the end of each primary time interval, according to the changes in state in the load table determined by the load control means, the value of the information "dyn_CP" 1117 is incremented by the value of the information "spec_CP" 1112, the value of the information "dyn_CT" 1118 is incremented by the value of the information "spec_CT" 1113, the value of the information "VC_state" 1119 goes from the "asleep" state to the "active" state.

Following operation 1206 or when the result of test 1205 is negative, an operation 1207 consists, for the central unit 206, of considering the following virtual channel in the table of specifications and priorities.

Next, test 1208 determines whether or not the end of the table of specifications and priorities has been passed. When the result of test 1208 is negative, operations 1204 to 1207 are reiterated. When the result of test 1208 is positive, that is to say when a secondary time interval has ended, a test 1209 determines whether or not the list of virtual channels with the "high" priority level has an item of state information "prio state" 1120 at the value "active". When the result of test 1209 is positive, during an operation 1210, the central unit 206 sends the packet whose filling is effected from the reference field 1120, which indicates the memory position of the next data to be sent, in predictive real-time connected mode, and updates the specifications of the virtual channel enabling the packet under consideration to be sent:

the information "dyn_CP" 1117 is decremented, if the information "dyn_CP" 1117 is equal to zero, the value of the information "VC_state" 1119 takes the value "asleep" and the next virtual channel with the same priority level is considered and, if there is no other virtual channel with the same priority level, the priority level has its information "prio_state" 1120 take the value "asleep".

The sending of the packet ends only when the next intermediate node has acknowledged the flow control which it has performed on the data of the said packet, as described in the standard IEEE-1355 and implemented by the components ST-C101 213 or 216 and ST-C104 209.

It will thus be noted that the conflicts in access to the transmission resources (the communication links) are detected by the packet transmission protocol, for example in accordance with IEEE-1355. The invention therefore makes it possible to limit the effects of these access conflicts in order equitably to distribute access to the resources between the different nodes in the network, whilst guaranteeing a service quality specified by the application requirement.

When the result of test 1209 is negative, a test 1211 determines whether or not the list of the virtual channels with the priority level "medium" has an item of state information "prio_state" 1120 at the value "active". When the result of test 1211 is positive, during an operation 1212, the central unit 206 sends a packet in guaranteed real-time connected mode and updates the specifications of the virtual channel enabling the packet under consideration to be sent:

the information "dyn_CP" 1117 is decremented, if the information "dyn_CP" 1117 is equal to zero, the value of the information "VC_state" 1119 takes the value "asleep" and the next virtual channel with the same priority level is considered and, if there is no other virtual channel with the same priority level, the priority level has its information "prio_state" 1120 take the value "asleep".

When the result of test 1211 is negative, a test 1213 determines whether or not the list of virtual channels with the "low" priority level has an item of state information "prio state" 1120 at the value "active". When the result of test 1213 is positive, during an operation 1214, the central unit 206 sends a packet in non-connected mode and updates the specifications of the virtual channel enabling the packet under consideration to be sent:

the information "dyn_CP" 1117 is decremented, if the information "dyn_CP" 1117 is equal to zero, the value of the information "VC state" 1119 takes the value "asleep" and the next virtual channel with the same priority level is considered and, if there is no other virtual channel with the same priority level, the priority level has its information "prio state" 1120 take the value "asleep".

When the result of test 1213 is negative, during an operation 1215, the central unit analyses the actual load on the network. To this end, the central unit 206 counts the periods of inactivity of the communication means, in order to adjust the number of packets to be sent by the virtual channel, for the low-priority traffic (that is to say in non-connected mode).

According to the number of secondary time intervals not used for the actual transmission of packets, the passband is increased, by incrementing the value "spec_CP" 1112 within the permitted limits.

Then the communication means ceases its transmissions until the result of test 1202 becomes positive.

Figure 4:
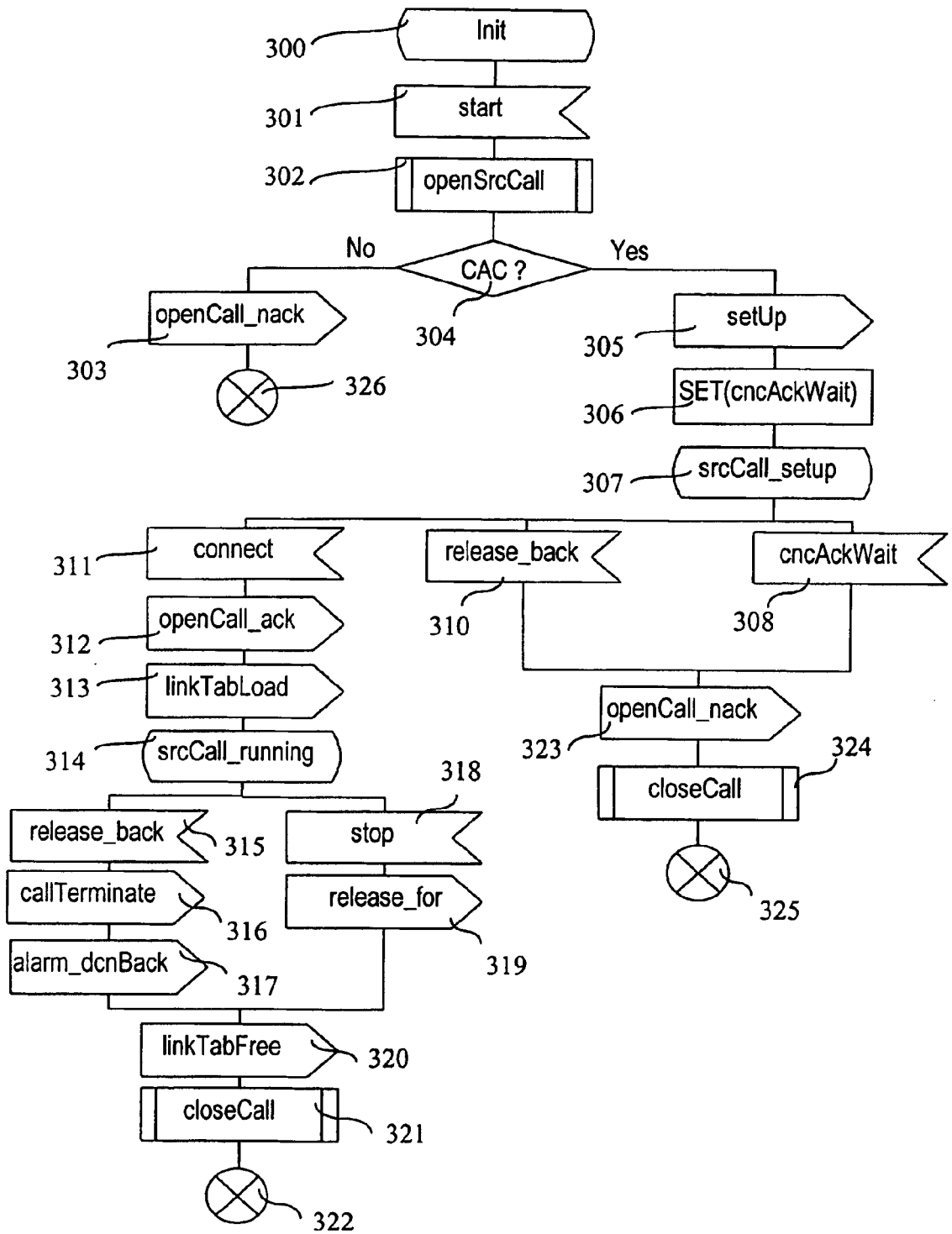
FIG. 4 depicts a flow diagram implemented by the communication means of the so-called "source" node for a transmission in connected mode.

The allocation or release of a virtual channel is effected by manipulation of:

the lists 1101 and 1102, during the execution of the different steps of management of a connection illustrated in FIG. 4, the list 1103, when a message "SendSyncData_req" or "SendAsyncData_cfr" is received, by the communication means, sent by the processing means, until the message has been transmitted completely.

Thus the load control means takes account of the actual load on the network in order to distribute the access rights between the different priority levels.

Figure 13:
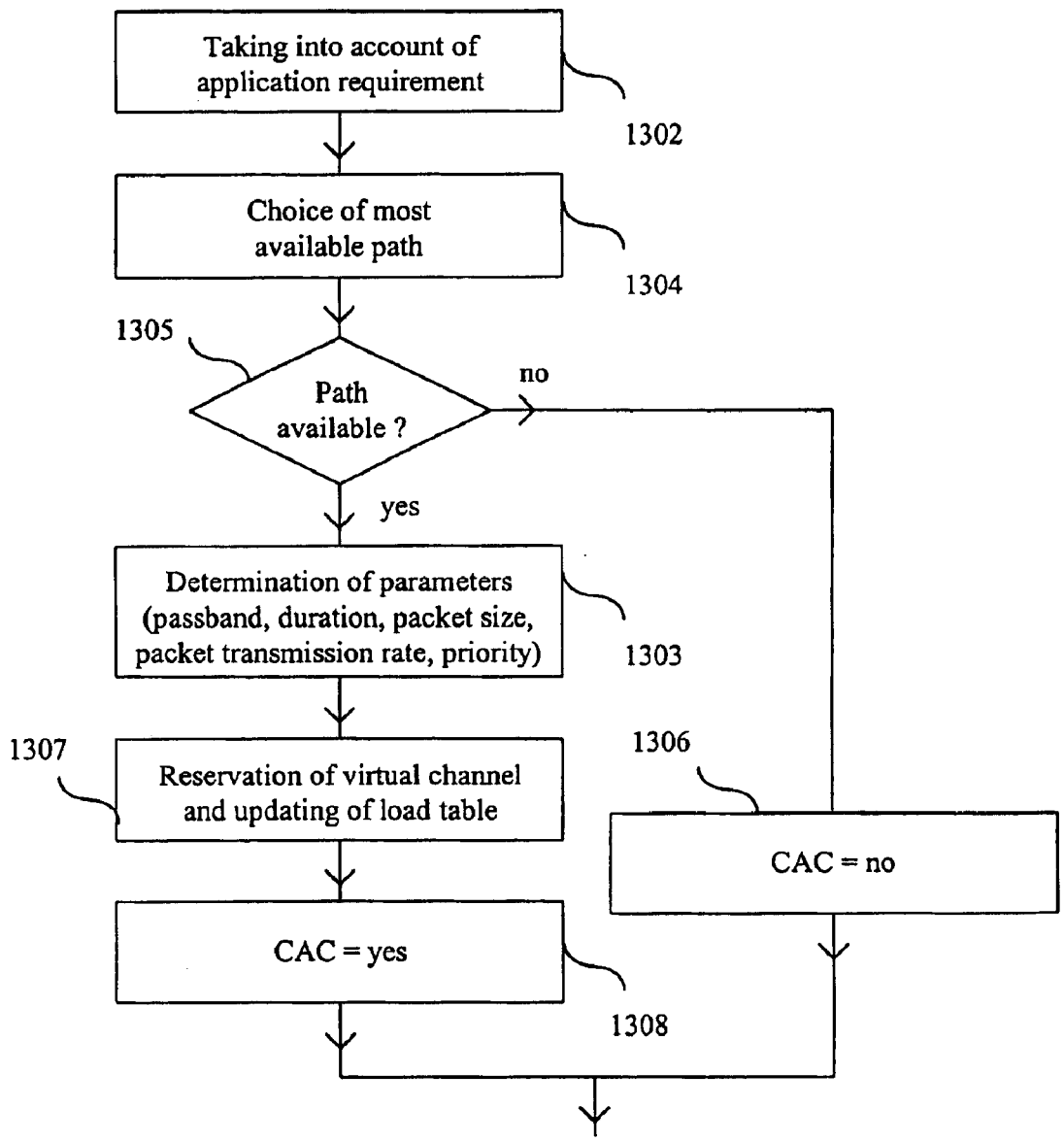
FIG. 13 depicts a flow diagram for determining, by the source node, the availability of a path for establishing a connection, incorporated in the flow diagram of FIG. 4.

FIG. 13 depicts a flow diagram for the determination, by the source node, of the availability of a path for establishing a connection, which corresponds, in FIG. 4, to operation 302.

The communication means takes into account the description of the application requirement established by the application or the peripheral which sends the message, during an operation 1302.

Then the communication means chooses the virtual channel and the most available path, during operation 1304, using the routing table.

During a test 1305, the communication means of the source node determines whether or not a path has been chosen during operation 1304.

When the result of test 1305 is negative, the communication means demands the stoppage of the procedure of setting up the connection, during an operation 1306. When the result of test 1305 is positive, the communication means calculates the traffic parameters, in particular the passband, the size of the packets transmitted, the transmission rates (sending frequencies) of packets and the priority of the communication corresponding to the field 1111 to 1113 illustrated in FIG. 11, using the load table, during an operation 1303.

Then, during an operation 1307, the communication means:

allocates a virtual channel, specifying the previously calculated traffic parameters, and varies the size of the packets with the load on the path and the transmission rate of the packets on said path, and updates its load table by means of the load control means.

Next, during an operation 1308, it demands the continuation of the setting up of the connection.

Operation 302 is then terminated.

Figure 5:
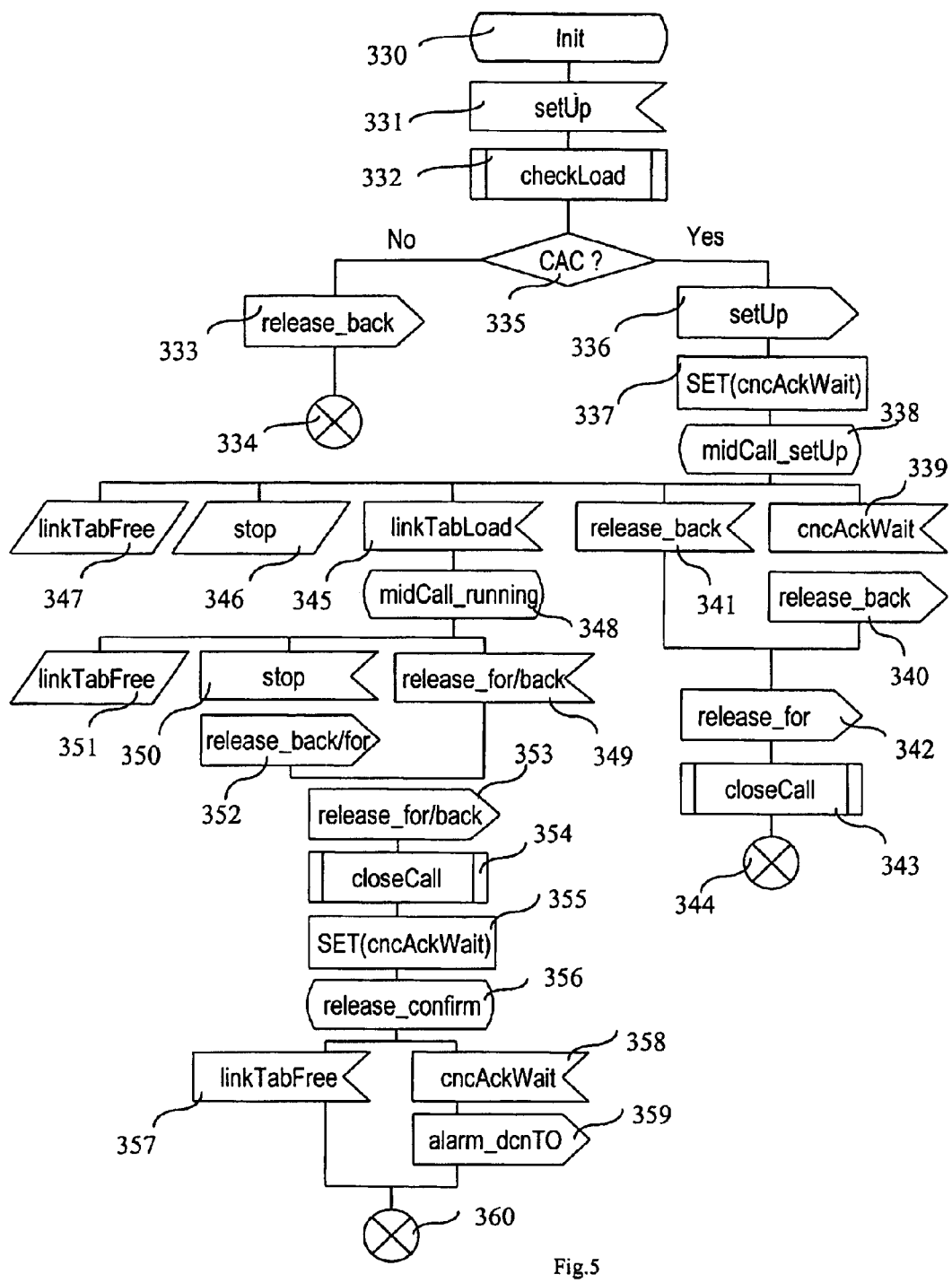
FIG. 5 depicts a flow diagram implemented by a communication means of a so-called "intermediate" node for a transmission in connected mode.
Figure 14:
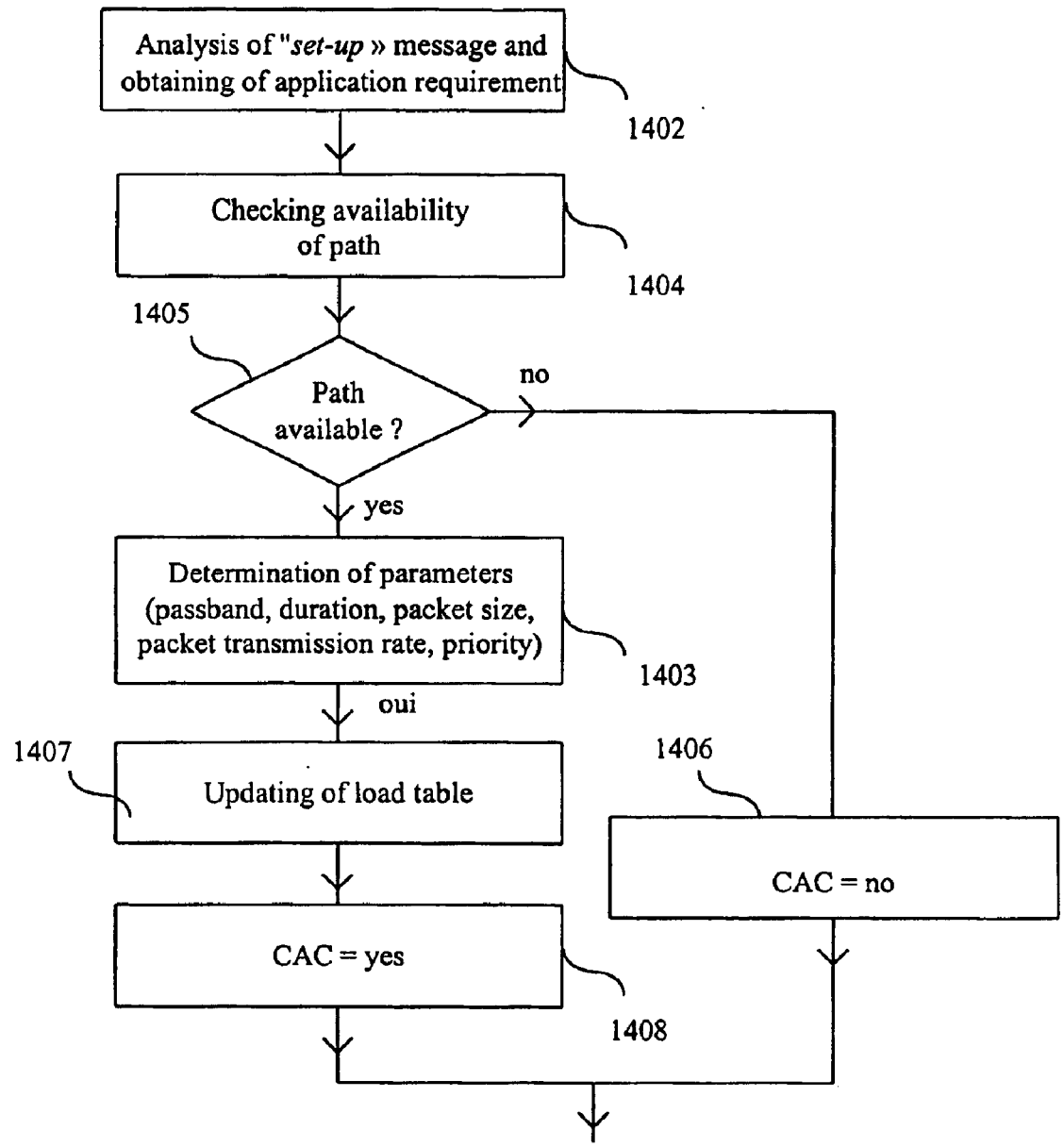
FIG. 14 depicts a flow diagram for determining, by an intermediate node or the destination node, the availability of a path for establishing a connection, incorporated in the flow diagram of FIG. 5 or 6.

FIG. 14 depicts a flow diagram for the determination, by an intermediate node or the destination node, of the availability of a path for establishing a connection, which corresponds, in FIGS. 5 and 6, to operations 332 and 372.

The communication means first of all obtains the description of the path and application requirement associated with the new connection, by reading the message 251 "set-up" coming from the source node (operation 305), during an operation 1402.

Then the communication means checks the availability of the path according to the application requirement, during the operation 1404, using the routing table.

During a test 1405, the communication means of the node under consideration determines whether or not the path is available during the operation 1404.

When the result of test 1405 is negative, the communication means demands the procedure of setting up the connection, during an operation 1406. When the result of the test 1405 is positive, the communication means calculates the traffic parameters, in particular the passband, the size of packets transmitted, the packet transmission rates (frequency of sending) and priority levels of the communication, using the load table, during an operation 1403.

Then, during an operation 1407, the communication means updates its load table by means of the load control means, which amounts to reserving the resources necessary for the connection envisaged, and then, during an operation 1408, it continues the setting up of the connection. At the end of one of the operations 1406 or 1408, the operation 334 is terminated.

The updating of the load table is accompanied by an updating of the traffic parameters associated with the existing virtual channels representing the outgoing traffic for the node under consideration, through the value of the fields 1111 to 113 for the connected traffic and 1111, 1113, 1115, 1116 for the non-connected traffic.

Figure 7:
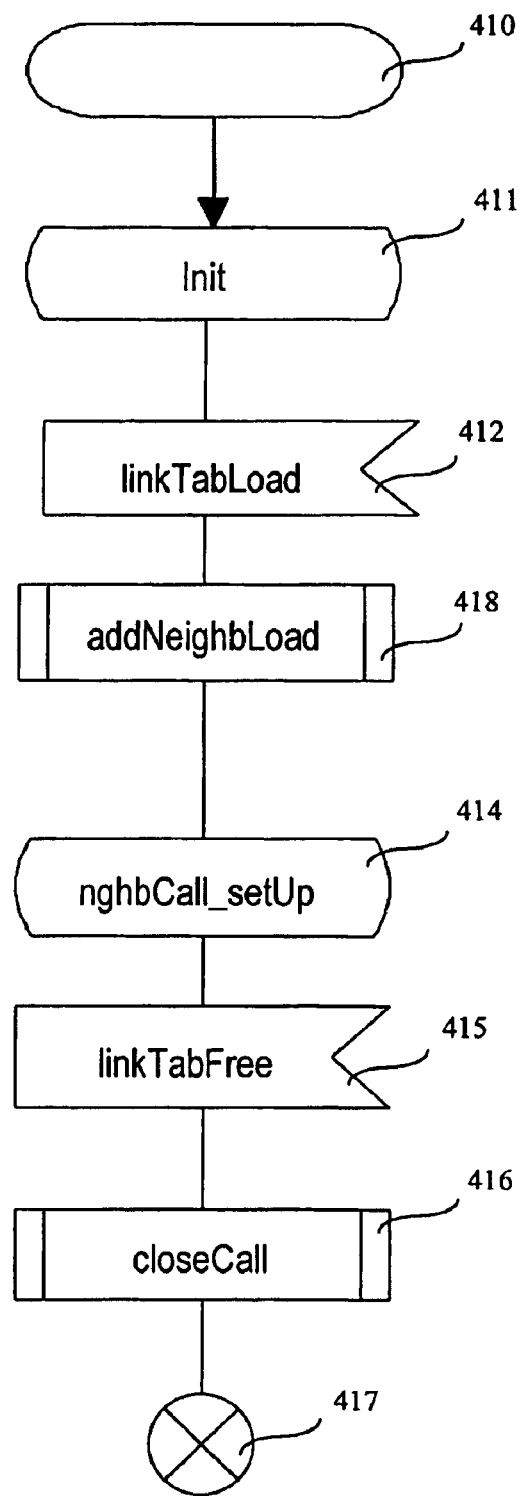
FIG. 7 depicts a flow diagram implemented by a communication means of a so-called "neighbouring" node for a transmission in connected mode.
Figure 15:
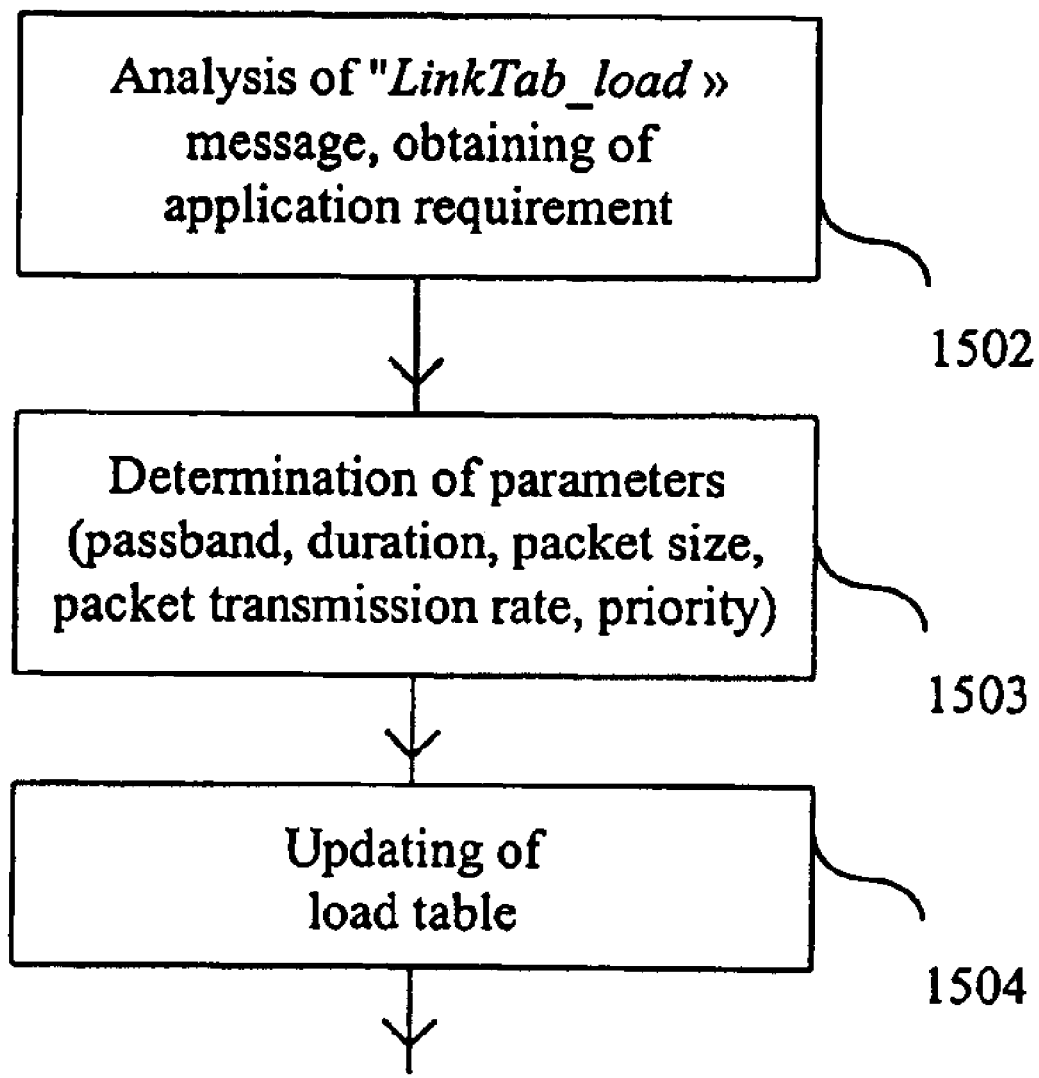
FIG. 15 depicts a flow diagram for the determination, by a neighbouring node, of the availability of a path for establishing a connection, incorporated in the flow diagram of FIG. 7.

FIG. 15 represents a flow diagram for the determination, by a neighboring node, of the availability of a path for establishing a connection, which corresponds, in FIG. 7, to operations 413.

The communication means obtains, first of all, the description of the path and of the application requirement associated with the new connection, by the reading the message 253 "LinkTabLoad" coming from the source node (operation 313), during an operation 1502.

Next, the communication means chooses the traffic parameters, in particular the passband, the size of the packets transmitted, the packet transmission rate and priority levels of the communication, using the load table, during an operation 1503. Next, during an operation 1504, the communication means updates its load table. At the end of the operation 1504, the setting up of the connection, by the neighboring node, is terminated.

What is claimed is:

1. A communication method for communicating on a network that includes communication devices, which perform communication in a connected mode or a non-connected mode, said method comprising:

for at least one of the communication devices which is to effect a transmission in the connected mode, an information operation during which the communication device broadcasts, on the network, an item of information representing a passband necessary for the transmission in the connected mode;

a passband allocation operation of allocating the passband for connected-mode transmissions based on the item of information, wherein the passband allocation operation is performed in coordination with all communication devices using the information operation;

a second allocation operation of allocating for non-connected-mode transmissions all or part of the passband not allocated for the connected-mode transmissions, for each communication device that is to effect a transmission in the non-connected mode, wherein the second allocation operation is performed independently from other communication devices in the network; and an adjustment of adjusting the allocated passband to avoid congestion on the network, and further comprising an information transmission operation that takes several priority levels into account, wherein, during the passband allocation operation, a passband associated with a priority level corresponding to the non-connected mode varies as a function of a period, which did not give rise to any transmission.

2. A communication method according to claim 1, wherein the period is a period separating a last transmission in the non-connected mode and a next transmission in the connected mode.

3. A communication method for communicating on a network that includes communication devices, which perform communication in a connected mode or a non-connected mode, said method comprising:

for at least one of the communication devices which is to effect a transmission in the connected mode, an information operation during which the communication devices broadcasts, on the network, an item of information representing a passband necessary for the transmission in the connected mode;

a passband allocation operation of allocating the passband for connected-mode transmissions based on the item of information, wherein the passband allocation operation is performed in coordination with all communication devices using the information operation;

a second allocation operation of allocating for non-connected-mode transmissions all or part of the passband not allocated for the connected-mode transmissions, for each communication device that is to effect a transmission in the non-connected mode, wherein the second allocation operation is performed independently from other communication devices in the network; and an adjustment operation of adjusting the allocated passband to avoid congestion on the network, and further comprising an information transmission operation that takes several priority levels into account;

wherein, during the passband allocation operation, a passband associated with a priority level corresponding to the non-connected mode varies as a function of a number of packets not transmitted during a predetermined period.

4. A communication device which performs communication in a connected mode or a non-connected mode, said device comprising:

information means, adapted to send an item of information representing a passband necessary for transmission in the connected mode on a network;

passband allocation means adapted to allocate the passband necessary for the transmission in the connected mode, wherein said passband allocation means is adapted to allocate all or part of the passband not allocated for the connected mode to a transmission in the non-connected mode, independently from other communication devices;

adjusting means to adjust the allocated passband to avoid congestion on the network; and information transmission means adapted to take into account several priority levels, wherein said passband allocation means is adapted to vary passband associated with a priority level corresponding to the non-connected mode according to a period, which has not given rise to any transmission.

5. A communication device according to claim 4, wherein said passband allocation means is adapted so that the period is a period separating a last transmission in the non-connected mode and a next transmission in the connected mode.

6. A communication device which performs communication in a connected mode or a non-connected mode, said device comprising:

information means, adapted to send an item of information representing a passband necessary for transmission in the connected mode on a network;

passband allocation means adapted to allocate the passband necessary for the transmission in the connected mode, wherein said passband allocation means is adapted to allocate all or part of the passband not allocated for the connected mode to a transmission in the non-connected mode, independently from other communication devices;

adjusting means adapted to adjust the allocated passband to avoid congestion on the network; and information transmission means adapted to take into account several priority levels, wherein said passband allocation means is adapted to vary passband associated with a priority level corresponding to the non-connected mode according to a number of packets not transmitted during a predetermined period.

* * * * *

UNITED STATES PATENT AND TRADEMARK OFFICE
CERTIFICATE OF CORRECTION

PATENT NO. : 6,891,797 B1
APPLICATION NO. : 09/345969
DATED : May 10, 2005
INVENTOR(S) : Laurent Frouin It is certified that error appears in the above-identified patent and that said Letters Patent is hereby corrected as shown below:

<u>TITLE PAGE, ITEM (56) REFERENCES CITED</u>:

Other Publication, "Shea, T.J. et al" should read --Shea, T.J. et al.,--/

<u>COLUMN 20</u>:

Line 55, "___ind")," should read -- ___ind",--.

<u>COLUMN 30</u>:

Line 24, "(FIG. 11)." should read --(FIG. 11))).--.

<u>COLUMN 35</u>:

Line 23, "113" should read --1113--.

<u>COLUMN 36</u>:

Line 38, "account;" should read --account,--; and
Line 62, "passband" should read --the passband--.

<u>COLUMN 38</u>:

Line 9, "passband" should read --the passband--.

Signed and Sealed this

Nineteenth Day of June, 2007

JON W. DUDAS
*Director of the United States Patent and Trademark Office*